(12) United States Patent
Baruch

(10) Patent No.: US 9,433,291 B2
(45) Date of Patent: *Sep. 6, 2016

(54) UTILITY CORNER SHELF BRACKET

(71) Applicant: MAGIC SHELF LTD, Macabim-Reut (IL)

(72) Inventor: Erez Baruch, Rehovot (IL)

(73) Assignee: MAGIC SHELF LTD, Macabim-Reut (IL)

( * ) Notice: Subject to any disclaimer, the term of this patent is extended or adjusted under 35 U.S.C. 154(b) by 485 days.

This patent is subject to a terminal disclaimer.

(21) Appl. No.: 13/907,902

(22) Filed: Jun. 1, 2013

(65) Prior Publication Data

US 2013/0264447 A1 Oct. 10, 2013

Related U.S. Application Data

(63) Continuation-in-part of application No. 13/074,032, filed as application No. PCT/IL2009/001061 on Nov. 12, 2009, now Pat. No. 8,453,982.

(60) Provisional application No. 61/117,251, filed on Nov. 24, 2008.

(51) Int. Cl.
| | |
|---|---|
| *A47B 96/06* | (2006.01) |
| *A47B 91/00* | (2006.01) |
| *A47B 13/00* | (2006.01) |
| *A47G 29/02* | (2006.01) |
| *A47B 96/02* | (2006.01) |
| *F16B 12/50* | (2006.01) |
| *F16B 12/46* | (2006.01) |

(52) U.S. Cl.
CPC ............. *A47B 96/06* (2013.01); *A47B 96/022* (2013.01); *F16B 12/46* (2013.01); *F16B 12/50* (2013.01); *Y10T 29/49826* (2015.01)

(58) Field of Classification Search
CPC ..... A47B 96/022; A47B 96/06; F16B 12/46; F16B 12/50; Y10T 29/49826
USPC ........... 248/220.1, 250, 247, 220.22, 222.14, 248/222.51, 300; 108/42, 147.11, 147.14, 108/147.17, 154, 156, 153.1, 157.1, 158, 108/158.11, 158.12, 158.13; 211/90.01, 211/134, 135, 186, 187, 105.2–105.6
See application file for complete search history.

(56) References Cited

U.S. PATENT DOCUMENTS

| | | | |
|---|---|---|---|
| 150,230 A | 4/1874 | Dobbs et al. | |
| 682,192 A | 9/1901 | Hazen | |
| 975,619 A | 11/1910 | Hollander et al. | |
| 1,159,813 A | 11/1915 | Volkhardt et al. | |
| 1,286,588 A | 12/1918 | Goodykoontz et al. | |
| 1,325,143 A * | 12/1919 | Conterio ................ | F16M 13/02 108/152 |
| 2,389,349 A | 11/1945 | Eastman | |

(Continued)

FOREIGN PATENT DOCUMENTS

NL 2003087 12/2010

*Primary Examiner* — Tan Le
(74) *Attorney, Agent, or Firm* — Mark M. Friedman

(57) ABSTRACT

A utility corner shelf bracket which enables easy installation and removal, which are done quickly and without requiring tools, of a utility corner shelf bracket, and placing a shelf upon it, and which it based on bows which are capable of bending on one plane and durable to loads perpendicular to this plane and a tensioning system which enables adjustment to the wall corner prior to installation and fastening to the wall during installation.

8 Claims, 14 Drawing Sheets

(56) References Cited

U.S. PATENT DOCUMENTS

| | | | |
|---|---|---|---|
| 2,465,635 A | 3/1949 | Conterio et al. | |
| 2,872,224 A | 2/1959 | Osborne | |
| 2,953,145 A * | 9/1960 | Moss | E04H 15/28 |
| | | | 135/117 |
| 3,572,787 A | 3/1971 | Timmerman et al. | |
| 3,754,728 A * | 8/1973 | Bowman | A47B 13/021 |
| | | | 108/156 |
| 3,783,931 A | 1/1974 | Assael | |
| 3,851,600 A | 12/1974 | Kohl | |
| 3,981,250 A | 9/1976 | Anthony | |
| 4,205,815 A | 6/1980 | Sauer et al. | |
| 4,555,082 A * | 11/1985 | Sack | A47B 96/022 |
| | | | 108/42 |
| 4,607,972 A | 8/1986 | Hennick | |
| 5,154,384 A | 10/1992 | Owens | |
| 5,992,654 A | 11/1999 | Dente, Jr. | |
| 6,059,128 A | 5/2000 | Wang | |
| 6,158,360 A | 12/2000 | Cheng | |
| 7,509,780 B2 * | 3/2009 | Leontaridis | E06B 3/982 |
| | | | 403/297 |
| 8,215,246 B2 | 7/2012 | Quam et al. | |
| 8,453,982 B2 * | 6/2013 | Baruch | A47B 96/022 |
| | | | 108/147.11 |
| 2013/0264447 A1 * | 10/2013 | Baruch | A47B 96/022 |
| | | | 248/235 |

* cited by examiner

UTILITY CORNER SHELF BRACKET

REFERENCE TO CROSS-RELATED APPLICATION

This application is a Continuation-in-Part of U.S. application Ser. No. 13/074,032 filed Mar. 29, 2011, which is a Continuation-in-Part of PCT/IL2009/001061, filed Nov. 12, 2009.

This application claims priority benefits from U.S. application Ser. No. 13/074,032 filed Mar. 29, 2011, which claims priority benefits from PCT/IL2009/001061, filed Nov. 12, 2009, which claims priority benefits from U.S. Provisional Application No. 61/117,251, Filed on Nov. 24, 2008, and from U.S. Provisional Application 61/218,948, filed on Jun. 21, 2009, the full disclosures of which are incorporated herein by reference.

FIELD OF THE INVENTION

The present invention relates to a shelf bracket, and, more particularly, to a utility corner shelf bracket.

BACKGROUND OF THE INVENTION

The need for installing shelves at intersections of structure walls or ends of furniture, which form corners, has existed for many generations. Many solutions are based on placing a shelf on a bracket, which has been fixed to the corner walls at the desired height.

A corner bracket is described in U.S. Pat. No. 1,325,143 (1919) of Conterio, which is incorporated by reference for all purposes as if fully set forth herein.

A shelf assembly and a support bracket are described in U.S. Pat. No. 4,555,082 (1985) of Sack, et al. which is incorporated by reference for all purposes as if fully set forth herein. This solution is supposed to overcome the limitations of previous solutions, including that of Conterio. These limitations also include being assembled of many separate components, whose assembly is expensive and time consuming, while also being aesthetically unpleasant to the sight.

However, even the solution of Sack, et al. has its faults, particularly the need for mounting means, such as nails or screws that are partially inserted into a pair of walls that form a corner before the installment of the shelf assembly.

None of the prior art devices enable easy installment and removal, which are done quickly and without requiring tools, of a utility corner shelf bracket, upon which a corner shelf is mounted.

There is therefore a need for a utility corner shelf bracket which enables easy installation and removal, which are done quickly and without requiring tools, and upon which a shelf can be mounted, and it would be advantageous if additional accessories could be engaged, for the purpose of bearing loads.

SUMMARY OF THE INVENTION

An embodiment of the present invention is described herein below in which a utility corner shelf bracket can be easily installed and removed, quickly and without requiring tools, and a shelf can be mounted upon it. The utility corner shelf bracket according to the present invention is composed of two external arced elastic bows and an internal arced elastic bow. Upon the external surface of one of the external elastic bows are insertion means and pulling means. Installation of the utility corner shelf bracket according to the present invention is an extremely simple process which includes manual tensioning, similar to tensioning a bow prior to shooting an arrow, placing it where it should be in the corner, releasing the manual tension, and applying pulling force between the bows with the pulling means, causing the insertion means to be inserted into the walls. Afterwards, all that remains to be done is to place a corner shelf on the utility corner shelf bracket. Removal is done by performing similar actions in reverse order. These actions can be performed in a matter of seconds.

According to the present invention there is provided a utility corner shelf bracket (100) including: a first bow (11), the first bow (11) including: two first bow wings (11b); a first bow arc (11a), wherein each one of the first bow wings (11b) is operatively connected to the first bow arc (11a); at least one nail (18) operatively connected to each one of the first bow wings (11b); a second bow (12) operatively connected to the first bow (11); and a pulling assembly (20), having a length, operatively connected to the second bow (12), wherein an operation of the pulling assembly (20) creates a pulling force on the second bow (12), and wherein the second bow (12) applies force to the two first bow wings (11b), wherein the utility corner shelf bracket (100) is adapted to be combined with at least one insert (80).

According to another feature of the present invention each one of the two first bow wings (11b) includes at least one first bow window (11bc), wherein each one of the first bow window (11bc) is configured to contain a an insert arm (82).

According to still another feature of the present invention the pulling assembly (20) includes: a turnbuckle sleeve (21c); a central rod (27), having two ends, wherein one of the ends of the central rod (27) is disposed on the second bow (12), and wherein one of the ends of the central rod (27) is engaged with the turnbuckle sleeve (21c); and a screwing rod (22a) having two ends wherein one end of the screwing rod end is engaged with the turnbuckle sleeve (21c).

According to still another feature of the present invention the utility corner shelf bracket (100) further including: a T rod (31) disposed on the screwing rod (23c); and two side rods (28) wherein each one of the side rods (28) is disposed on the T rod (31), and wherein a rotation of the turnbuckle sleeve (21c) changes the length of the pulling assembly (20).

According to still another feature of the present invention the utility corner shelf bracket (100) further including: at least one insert (80), wherein the insert (80) is inserted with the utility corner shelf bracket (100).

According to still another feature of the present invention the at least one insert (80) includes: an insert body (81); and an adhesive layer (18b) attached to the insert body (81).

According to still another feature of the present invention the at least one insert (80) includes: an insert body (81); and at least one nail (18) attached to the insert body (81).

According to the present invention there is provided an insert (80), including: an insert body (81); and at least one inserting means (89) attached to the insert body (81), wherein the insert (80) is adapted to be inserted with a utility corner shelf bracket (100).

According to another feature of the present invention the inserting means (89) includes: an insert arm (82); and an insert push button (83) having an insert stair (84), the insert push button (83) is attached to the insert arm (82).

According to still another feature of the present invention the insert (80) further including: at least one nail (18), attached to the insert body (81).

According to still another feature of the present invention the insert (80) further including: an adhesive layer (18b), attached to the insert body (81).

According to the present invention there is provided a utility corner shelf bracket (100) including: a first bow (11), the first bow including: a first bow arc (11a); two first bow wings (11b), wherein each one of the first bow wings (11b) is operatively connected to the first bow arc (11); two pressing handles (36), wherein each one of the pressing handles (36) is disposed on one of the first bow wings (11b); and a second bow (12) having two ends (12a), wherein each one of the ends (12a) of the second bow (12) is disposed on an element of the utility corner shelf bracket (100) selected from a group consisting of the first bow wings (11b), and the pressing handles (36).

According to another feature of the present invention the utility corner shelf bracket (100) is made as a one integral piece of an elastic material.

According to still another feature of the present invention the utility corner shelf bracket (100) further including: at least one nail (18) disposed on each one of the first bow wings (11b).

According to still another feature of the present invention the utility corner shelf bracket (100) further including: at least one strengthening rib (30) disposed on one of the first bow wings (11b).

According to still another feature of the present invention the utility corner shelf bracket (100) further including: at least one hanging device (37) disposed on the second bow (12).

According to still another feature of the present invention the first bow arc (11a) and the second bow (12) are springs, wherein in a free state the first bow arc (11a) has a bow arc bending angle (C) of at most ninety degrees and wherein the second bow (12) has a second bow bending angle (D) of at least forty degrees.

According to still another feature of the present invention the utility corner shelf bracket (100) is made of a polymer.

According to still another feature of the present invention the utility corner shelf bracket (100) further including: two nail protectors (50), wherein each one of the two nail protectors (50) is connected to another one of the first bow wings (11b) by a protector connector (50a).

According to still another feature of the present invention the utility corner shelf bracket (100) further including: (e) two protective wings (60), wherein each one of the protective wings (60) has at least one protective wing hole (60a), wherein each one of the protective wings (60) has a protective wing connecting end (60b), wherein each one of the protective wing connecting ends (60b) is connected to the first bow (11), wherein the connection is configured to produce a moment force which tends to couple the protective wing (60) to another one of the first bow wings (11b); and (f) two protective wing supports (61), wherein each one of the protective wing supports (61) has a protective wing support first end (61a), and a protective wing support second end (61b) wherein each one of the protective wing support first ends (61a) is connected to another one of the two pressing handles (36), wherein each one of the protective wing supports (61) is made of an elastic material, wherein each one of the pressing handles (36) has a handle groove (36a), wherein each one of the protective wing support second ends (61b) is configured to prevent another one of the protective wings (60) to move in with a tendency for coupling the protective wing (60) to another one of the first bow wing (11b), if there is applied an external force on the protective wing supports (61) and to gather, at least partially, into the handle grooves (36a) and cease from preventing another one of the protective wings (60) to move in a tendency for coupling the protective wing (60) to another one of the first bow wings (11b), if an external force is applied on the protective wing supports (61).

According to still another feature of the present invention the utility corner shelf bracket (100) further including: two first integral pivots (73), wherein each one of the two first integral pivot (73) is attached to another one of the first bow wings (11b); two shield arms (70), wherein each one of the two shield arms (70) is attached to another one of the two first integral pivots (73); two second integral pivots (73a), wherein each one of the two second integral pivots (73a) is attached to another one of the two shield arms (70); and two nails shield (70) wherein each one of the two nails shield (70) is attached to another one of the two second integral pivots (73a).

According to still another feature of the present invention each one of the two nail shields (70) includes: a shield front wall (71); and two shield side walls (72), wherein each one of the two shield side walls (72) is attached to the shield front wall (71), and wherein at least one of the two shield side walls (72) has a side wall slot (72a).

According to still another feature of the present invention the utility corner shelf bracket (100) further including: at least one first bow first pin (11e) attached to each one of the first bow wing; and at least one first bow second pin (11f) attached to each one of the first bow wing.

According to still another feature of the present invention at least one of each of the two shield side walls (72) of the nails shield has an shield stair (94).

According to still another feature of the present invention at least one of the first bow first pin (11e) is located inside one of the wall slots (72a).

According to still another feature of the present invention the utility corner shelf bracket (100) further including: at least one nail (18) disposed on each one of the first bow wings (11b).

Additional objects and advantages of the invention will be set forth in part in the description which follows and, in part, will be obvious from the description, or may be learned by practice of the invention.

DETAILED DESCRIPTION OF EMBODIMENTS

Figure 1:
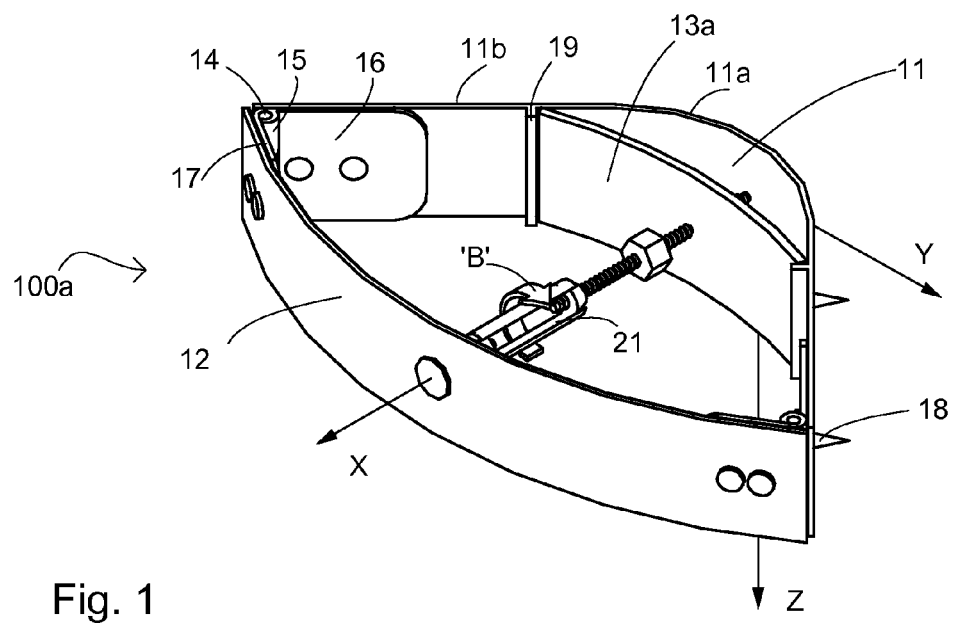
FIG. 1 is an isometric schematic illustration of an illustrative, exemplary first embodiment of a utility corner shelf bracket, according to the present invention.

The present invention is of a utility corner shelf bracket and of a method for its installation with a shelf in a corner wall, and a method of removing them from the corner wall.

The principles and operation of a utility corner shelf bracket according to the present invention may be better understood with reference to the drawings and the accompanying description. Before explaining at least one embodiment of the invention in detail, it is to be understood that the invention is not limited in its application to the details of construction and the arrangement of the components set forth in the following description or illustrated in the drawings.

Unless otherwise defined, all technical and scientific terms used herein have the same meaning as commonly understood by one of ordinary skill in the art to which this invention belongs. The materials, dimensions, methods, and examples provided herein are illustrative only and are not intended to be limiting.

To remove any doubt, note that the manner in which the elements of the present invention are described in the illustrations can be highly detailed, however is not in any way limiting the present illustration, but rather is for the purpose of clarification and furthering understanding. The present invention can be implemented in embodiments that differ from the specification given with regard to the illustration.

The following list is a legend of the numbering of the application illustrations:
- 11 first bow
- 11a first bow arc
- 11b first bow wing
- 11bb first bow flap
- 11bc first bow window
- 11bd first bow wing outer surface
- 11c first bow extender
- 11e first bow first pin
- 11f first bow second pin
- 12 second bow
- 12a first end of a second bow
- 12b second end of a second bow
- 13a third bow (of first embodiment)
- 14 hinge
- 15 socket
- 16 first socket plate
- 17 second socket plate
- 18 nail
- 18b adhesive layer
- 19 support
- 20 pulling assembly
- 21a turnbuckle sleeve (of first embodiment)
- 21c turnbuckle sleeve (of second and third and embodiments)
- 22a first screwing rod
- 23a second screwing rod (of first embodiment)
- 23c second screwing rod (of second embodiments)
- 24 first nut
- 25 second nut
- 27 central rod
- 28 side rod
- 30 strengthening rib
- 31 T rod
- 36 pressing handle
- 36a pressing handle groove
- 37 hanging device
- 40 load
- 50 nail protector
- 50a protector connector
- 50b protector pin
- 50c first bow wing hole
- 60 protective wing
- 60a protective wing hole
- 60b protective wing connecting end
- 61 protective wing support
- 61a protective wing support first end
- 61b protective wing support second end
- 70 nail shield
- 71 shield front wall
- 72 shield side wall
- 72a side wall slot
- 73 shield arm
- 73a first integral pivot
- 73b second integral pivot
- 74 shield stair
- 80 insert
- 81 insert body
- 81a insert area
- 82 insert arm
- 83 insert push button
- 84 insert stair
- 85 insert outer surface
- 86 insert nail housing
- 87a insert outer side wall
- 87b insert inner side wall
- 88 insert back rail
- 89 inserting means
- 100c utility corner shelf bracket (second embodiment)
- 100f utility corner shelf bracket (third embodiment)
- 101 corner wall
- 102 corner shelf
- F force When the accompanying description of a specific illustration mentions an element not shown in that illustration or without numbering, its numbering is shown in parentheses, and can be found in one or more other illustrations.

Referring now to the drawings, FIG. 1 is an isometric schematic illustration of an illustrative, exemplary first embodiment of a utility corner shelf bracket 100a, (first embodiment), according to the present invention.

The utility corner shelf bracket 100a (first embodiment) includes a first bow 11 and a second bow 12, connected to each other at their ends so as to enable angular movement between their ends around two hinges 14, one at each end, which form a closed shape from top view. Each hinge 14 is assembled within a socket 15, which can be an integral part of a first socket plate 16, which is engaged with an additional socket, which can be an integral part of a second socket plate 17, while the two first socket plates 16 are disposed near both ends of the first bow 11, and the two second socket plates 17 are disposed near both ends of the second bow 12.

In another possible embodiment, the sockets are integral parts of the first bow 11 and the second bow 12. The first bow 11 and second bow 12 have arced shapes, while the center point of the first bow 11 is origin of a Cartesian axis system, whose axes X, Y, and Z, are in directions shown in the present illustration: the X axis is in the direction of the center point of the second bow 12, the Y axis is to the left, in view from the origin, on a plane parallel to that on which the first bow 11 and second bow 12 are placed so that after assembly to a corner wall (101), assuming that its walls are vertical, it is essentially a horizontal plane, and the Z axis in this state is vertically downwards. The central part of first bow 11 has a first bow arc 11a and two first bow wings 11b, each of which progresses to one of either end of first bow arc 11a, and whose shape is planar after assembly to the corner wall (101), (if the wall is planar), as will be shown in FIG. 2. The external side of each first bow wing 11b has several nails 18, which are designated for insertion into the corner wall (101) after assembly, in order to prevent movement between the utility corner shelf bracket 100a (first embodiment), and the corner wall (101). In order to facilitate the prevention of movement, the external surface of each first bow wing 11b can have a high friction coefficient, which can be achieved either by selection of the material and the processing of the surface, or by adding an external layer of a suitable material, such as a layer of rubber.

The first bow 11 and second bow 12 can be composed of various materials, such as aluminum, and have a good ability for bending on the XY plane, suitable for manual forces applied on a pulling assembly (20), while they are durable to loads in the direction of the Z axis which may be applied to the corner shelf 102 while it is mounted upon the utility corner shelf bracket 100a (first embodiment).

Inwards from the first bow 11 and second bow, is a third bow 13a, (of the first embodiment), whose ends rest upon two supports 19, each of which is disposed on the internal side of the first bow 11 for the purpose of transmitting forces from the first bow 11 and second bow 12, which are generated at a certain point which will be described later on, by the pulling assembly 20. Note that this form of force transmission from the third bow 13a, (of the first embodiment), to the first bow 11, is one viable option of several, and does not limit the present invention in any way.

The pulling assembly (20), one possible structure of which, and whose method of action, will be specified later on, includes a turnbuckle sleeve 21a, with left and right hand internal threads on both ends, which can be rotated to the left or to the right, for purposes that will be specified later on, around axis X, with the rotation leftward in view from the origin, around axis X, marked in the present illustration with arrow 'B'.

Figure 2:
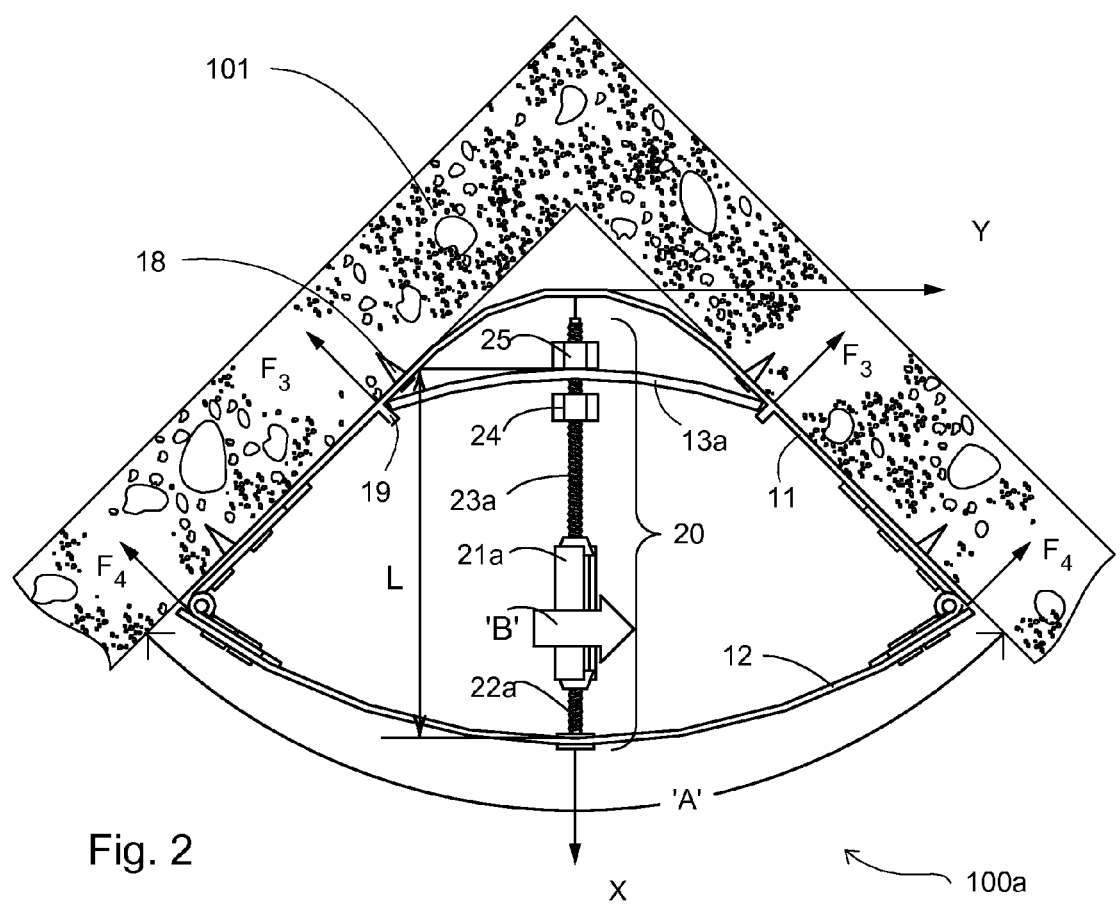
FIG. 2 is a top schematic illustration of an illustrative, exemplary first embodiment of a utility corner shelf bracket, installed in a corner wall, according to the present invention.

FIG. 2 is a top schematic illustration of an illustrative, exemplary first embodiment of a utility corner shelf bracket 100a (first embodiment), installed on a corner wall 101, according to the present invention.

In this state, the angle 'A' formed between both of the first bow wings lib, equals the angle formed between both walls comprising the corner wall 101, and the nails 18 are inserted in the walls. In this state, a corner shelf 102 can be placed upon the utility corner shelf bracket 100a (first embodiment). The angle 'A' is, in most cases, of 90 degrees, however the utility corner shelf bracket 100a (first embodiment), can also be installed in other values of this angle.

The pulling assembly 20, which can apply pulling force, is disposed along the X axis, between the second bow 12, and the third bow 13a (of the first embodiment), which applies forces $F_3$ on the first bow wings lib. This pulling also causes the second bow 12 to apply forces $F_4$ on the first bow wings lib. These force components fasten the first bow wings lib towards the two walls of the corner wall 101.

The pulling assembly 20, shown in the illustrations of the present patent application, includes two rods, a first screwing rod 22a, with external threads in a first direction, and a second screwing rod 23a, with external threads in a second direction.

The two rods are engaged with turnbuckle sleeve 21a, namely are screwed into turnbuckle sleeve 21a, which has left and right hand internal threads at both of its ends and ability to rotate left and right around the X axis, as shown by arrow 'B'.

The turnbuckle sleeve 21a can be shaped as a cylinder with a closed wall or partial wall, as shown in the illustrations of the present application.

The first screwing rod 22a is connected to a second bow 12, and the second screwing rod 23a is connected to a third bow 13a (of the first embodiment), through a hole in its center, and its location, according to one embodiment, can be adjusted by means of a first nut 24, and a second nut 25. In this manner, the operation of the pulling assembly 20, which is done by means of rotation of the turnbuckle sleeve 21a, in one direction, changing its length L, results in the first_rod 22a and the second screwing rod 23a moving towards one another, creating the pulling force described above, while rotation in the other direction causes the rods to move away from one another, and the pulling force is replaced by a pushing force which reverses the directions of forces $F_3$ and $F_4$, thus decreasing the angle 'A' between the two first bow wings lib and therefore causing their moving away and the removal of the nails 18 from the walls.

Figure 3:
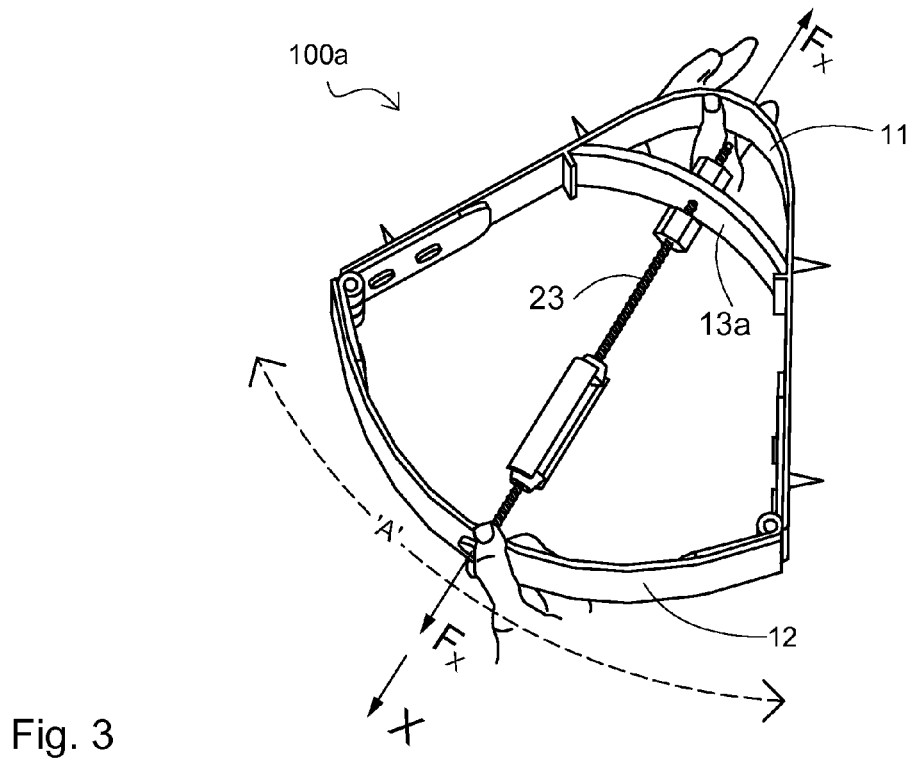
FIG. 3 is an isometric schematic illustration of an illustrative, exemplary first embodiment of a utility corner shelf bracket, at a stage prior to installation, according to the present invention.

FIG. 3 is an isometric schematic illustration of an illustrative, exemplary first embodiment of a utility corner shelf bracket 100a (first embodiment), at a stage prior to installation, according to the present invention.

At this stage, the installing person, who can be without any special expertise, uses both hands to tension the utility corner shelf bracket 100a (first embodiment), along the X axis, ensuring that the angle 'A' is small enough to bring close to the corner wall 101.

Figure 4:
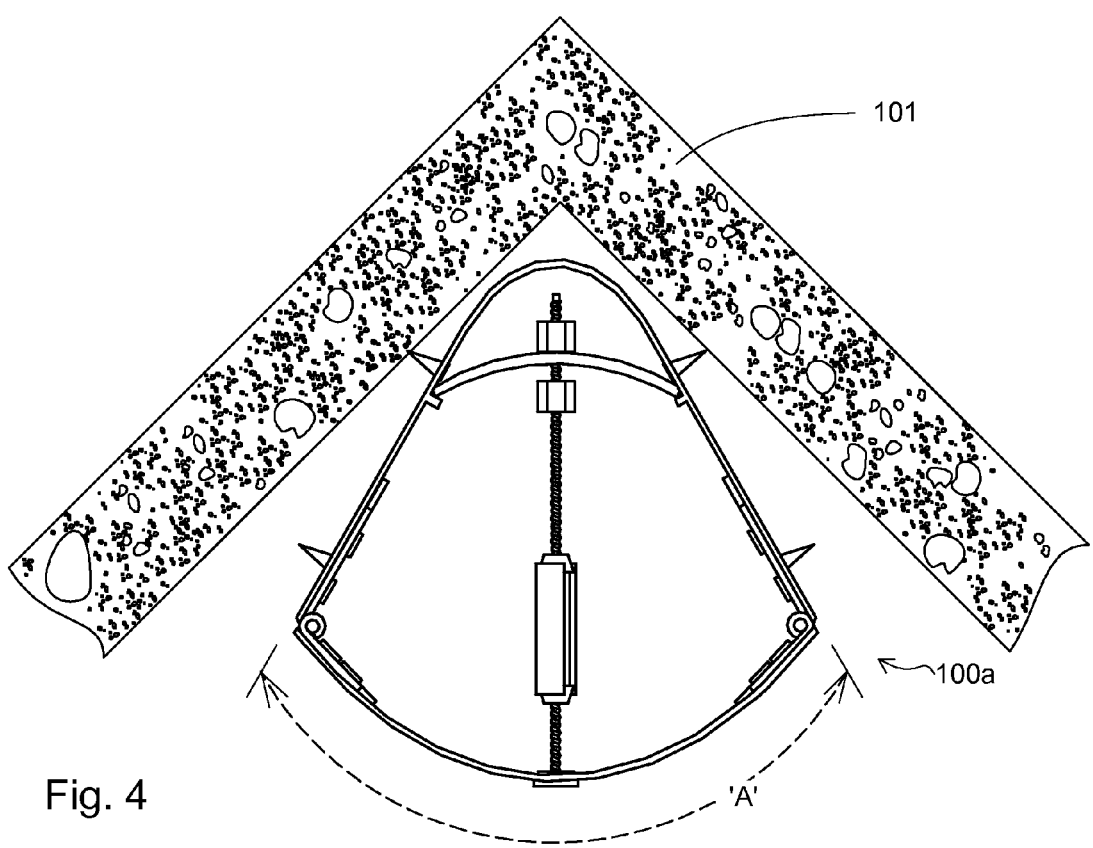
FIG. 4 is a top schematic illustration of an illustrative, exemplary first embodiment of a utility corner shelf bracket, in a corner wall, at a stage prior to installation, according to the present invention.

FIG. 4 is a top schematic illustration of an illustrative, exemplary first embodiment of a utility corner shelf bracket 100a (first embodiment), installed at a corner wall 101, at a stage prior to installation, according to the present invention.

Because angle 'A' is sufficiently small, the utility corner shelf bracket 100a (first embodiment), can be brought close to the corner wall 101, as shown in the present illustration, for the purpose of installation.

Figure 5:
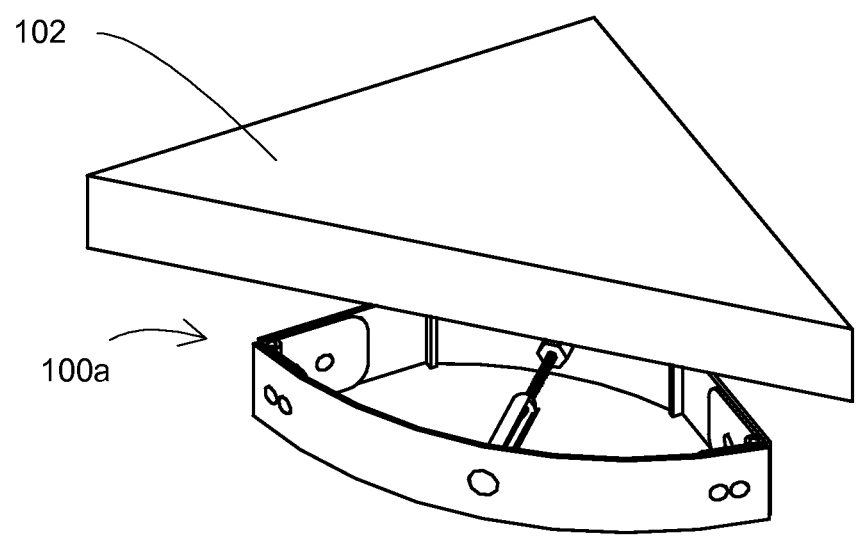
FIG. 5 is an isometric schematic illustration of an illustrative, exemplary first embodiment of a utility corner shelf bracket, and a shelf, at a stage prior to placing the shelf on the utility corner shelf bracket, according to the present invention.

FIG. 5 is an isometric schematic illustration of an illustrative, exemplary first embodiment of a utility corner shelf bracket 100a (first embodiment), and a corner shelf 102, at a stage prior to placing the shelf 102 on the utility corner shelf bracket 100a, (first embodiment), according to the present invention.

Figure 6:
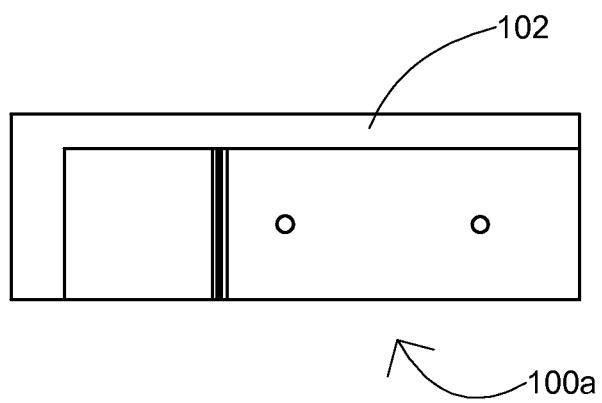
FIG. 6 is a right side schematic illustration of an illustrative, exemplary first embodiment of a utility corner shelf bracket, and a shelf, at a stage following placing the shelf on the utility corner shelf bracket, according to the present invention.

FIG. 6 is a right side schematic illustration of an illustrative, exemplary first embodiment of a utility corner shelf bracket 100a (first embodiment), and a corner shelf 102, at a stage following placing the corner shelf 102 upon the utility corner shelf, according to the present invention.

The invention according to the present patent application is not limited to the installation of the utility corner shelf bracket 100a (first embodiment), in corners of vertical walls, and it can also be installed, for example, in a corner formed between a wall and a ceiling.

A method for installing a utility corner shelf bracket (100a) (first embodiment), and a corner shelf (102) at a corner wall includes the stages of:
  providing a utility corner shelf bracket (100a) (first embodiment)), and a shelf (102);
  tensioning the utility corner shelf bracket (100a) (first embodiment);
  turning the turnbuckle sleeve (21a), until the nails (18) are sufficiently inserted into the walls; and
  placing the corner shelf (102) upon the utility corner shelf bracket.

The method for removing a utility corner shelf bracket (100a) (first embodiment), and a corner shelf (102) from a corner wall includes the stages of:
  removing the corner shelf (102) from the utility corner shelf bracket (100a) (first embodiment);
  turning the turnbuckle sleeve, until reaching extraction of the nails (18) from the walls; and
  removing the utility corner shelf bracket (100a) (first embodiment) from the corner wall.

The following illustrations and the accompanying description specifies additional embodiments.

Many of the structural features and qualities typical of the first embodiment also apply to these additional embodiments. Various combinations of structural elements and features mentioned in the present patent application can serve for additional embodiments of the utility corner shelf bracket according to the present invention.

Figure 7A:
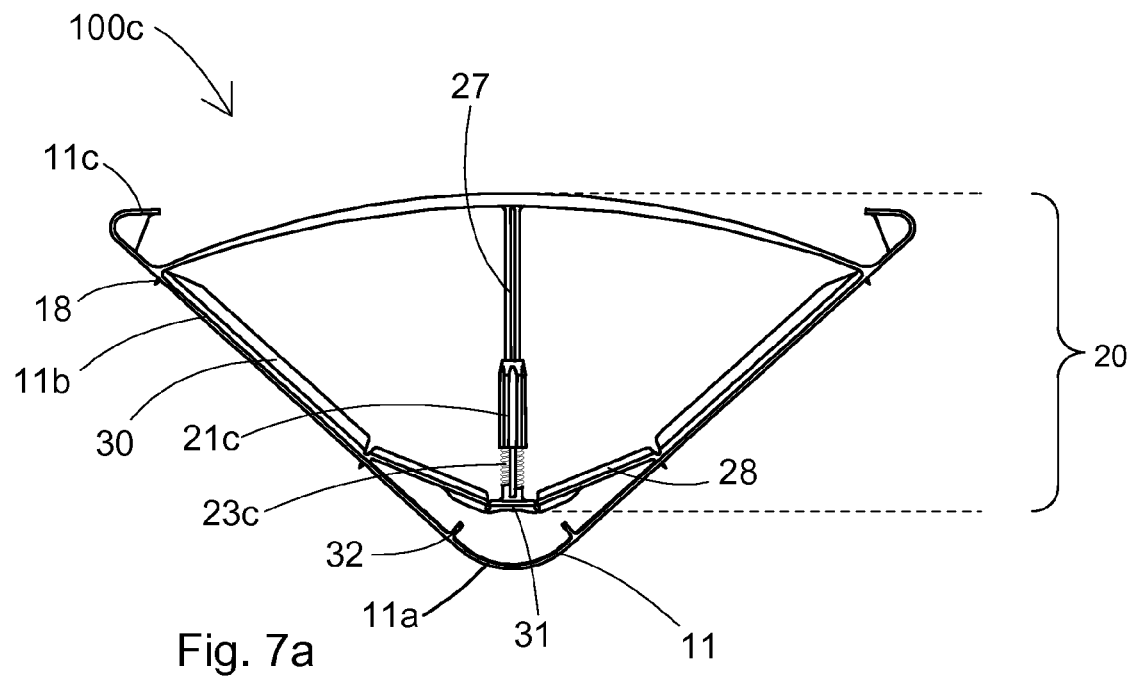
FIG. 7a is a top view schematic illustration of an illustrative, exemplary second embodiment, first variant of a utility corner shelf bracket, according to the present invention.

FIG. 7a is a top schematic illustration of an illustrative, exemplary second embodiment, first variant of the utility corner shelf bracket 100c, according to the present invention.

The pulling assembly 20 of the present illustration includes a central rod 27 (of second), a turnbuckle sleeve 21c (of second embodiments), and a second screwing rod 23c (of second embodiments), whose end is connected to a T rod 31, both of whose ends have shafts which are connected to two side rods 28, as shown in the illustration.

The central part of first bow 11 has a first bow arc 11a and two first bow wings 11b, each of which progresses to one of either end of first bow arc 11a, and whose shape is planar after assembly to a corner wall (101) (if the wall is planar).

The internal wall of the first bow 11 has at least one support rod 32, which prevents overextension, and thus protects the user's fingers. Each first bow wing 1ib on the internal wall is connected to a strengthening rib 30, which provides additional resistance to bending and facilitates mounting up to a wall.

The first bow extenders 11c lie shown in the present illustration are of another possible top view shape, and as noted, are designated to increase the area of contact with the corner shelf (102).

Figure 7B:
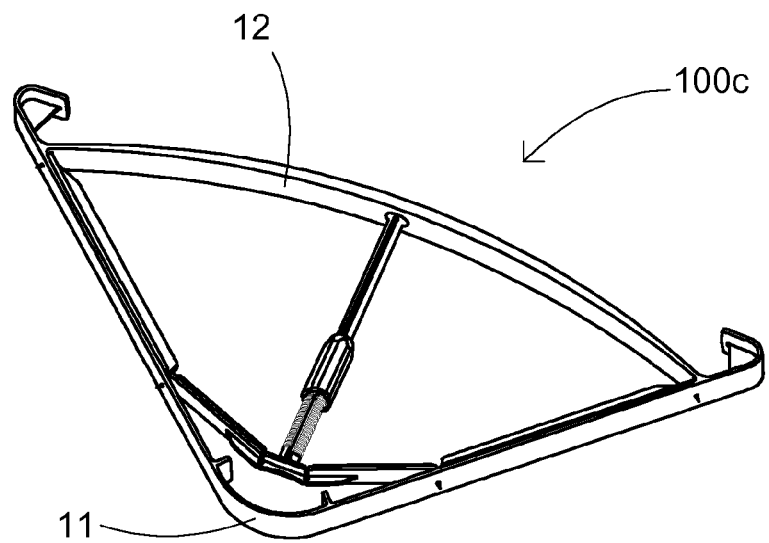
FIG. 7b is an isometric view schematic illustration of an illustrative, exemplary second embodiment, first variant of a utility corner shelf bracket, according to the present invention.

FIG. 7b is an isometric schematic illustration of an illustrative, exemplary second embodiment, first variant of the utility corner shelf bracket 100c, according to the present invention.

Figure 7C:
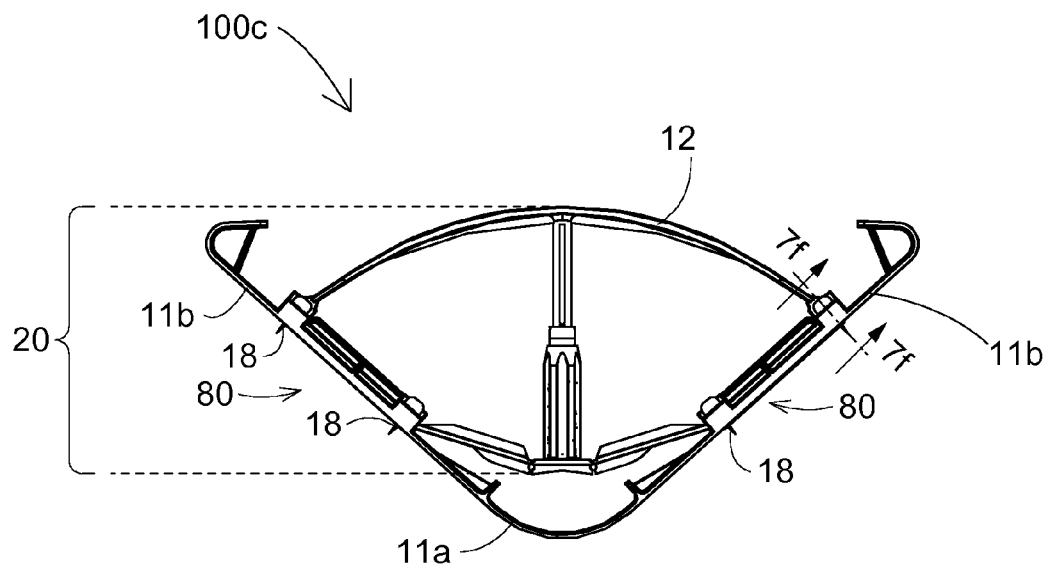
FIG. 7c is a top view schematic illustration of an illustrative, exemplary second embodiment, variant of the utility corner shelf bracket and of two inserts, according to the present invention, upon which the section plane 7f-7f is marked

FIG. 7c is a top view schematic illustration of an illustrative, exemplary second embodiment, second variant of the utility corner shelf bracket 100c, and two inserts 80, according to the present invention, upon which the section plane 7f-7f is marked.

In this configuration, no nail 18 is permanently attached to a first bow wing 11b. The attachment to a corner wall 101 (not shown in the present drawing) can be done by means of nails 18 connected to insert 80 or by means of an adhesive layer 18b (not shown in the preset drawing), which is upon an insert 80 that is free of nails 18.

A user assembling the second embodiment, second variant of the utility corner shelf bracket 100c can choose the type of insert 80 suitable for attachment to the corner wall 101 according to the type of wall. Each one of the first bow wings 11b can be mounted with an insert 80 which can be removed and replaced with another insert 80 as necessary.

Even though the present invention mentions only two means for mounting insert 80 to a surface such as a wall, the present invention is in no way limited to these specific two means. Likewise, an insert 80 can include both nails 18 and an adhesive layer 18b (not shown in the present drawing).

The pulling assembly 20 is connected to second bow 12 which is connected to both first bow wings 11b which are connected to first bow arc 11a.

The utility corner shelf bracket 100c includes a pulling assembly 20 as described in FIG. 7a, however, the present invention is in no way limited to pulling assembly 20, and other variations and types of pulling assemblies.

Figure 7D:
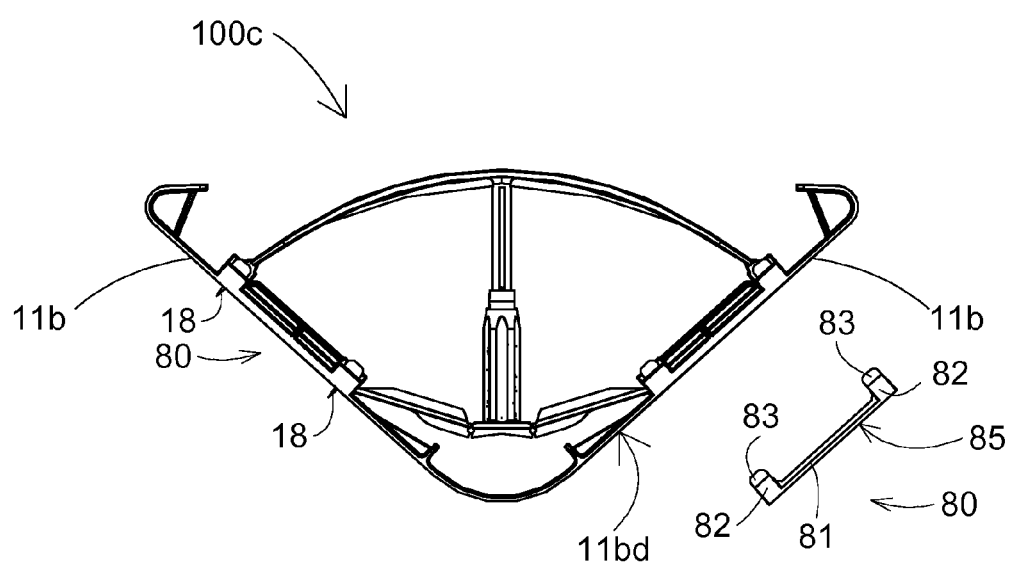
FIG. 7d is a top view schematic illustration of an illustrative, exemplary second embodiment, second variant of the utility corner shelf bracket, according to the present invention.

FIG. 7d is a top view schematic illustration of an illustrative, exemplary second embodiment, second variant, of the utility corner shelf bracket 100c and two inserts 80, according to the present invention.

In the present illustration, an insert 80 equipped with nails 18 is mounted on one of the first bow wings 11b of the utility corner shelf bracket 100c and facing the second first bow wings 11b, is disposed an insert 80 without nails 18.

The first bow wings 11b and the inserts 80 are configured so that the insert outer surface 85 practically creates a unified surface with the first bow wing outer surface 11bd, or as another possibility, the outer surface 85 slightly protrudes, relative to the dimensions of the inserts 80, in order to enable good adhesion to the wall if the attachment to the wall is by means of adhesive. In the configuration shown in the present illustration each one of the inserts 80 has an insert body 81, from which four elastic insert arms 82 protrude, at the end of each of which is an insert push button 83, however according to the present invention, other configurations of inserts 80 are also possible.

Figure 7E:
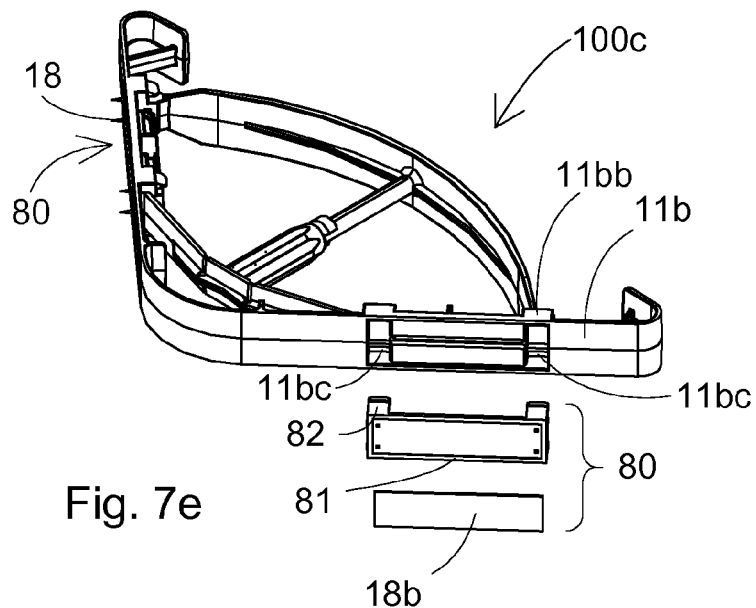
FIG. 7e is an isometric view schematic illustration of an illustrative, exemplary second embodiment, variant of the utility corner shelf bracket and two inserts, according to the present invention.

FIG. 7e is an isometric view schematic illustration of an illustrative, exemplary second embodiment, second variant of the utility corner shelf bracket 100c and two inserts 80, according to the present invention.

In the present illustration an insert 80 equipped with nails 18 is mounted on one of the first bow wings 11b of the utility corner shelf bracket 100c and facing the second first bow wings 11b is disposed an insert 80 without nails 18. In this state, the illustration shows two first bow windows 11bc. In the configuration shown in the present illustration, each one of both first bow wings 11b has four first bow windows 11bc, the shape and location of which correspond with those of the insert arms 82 for the purpose of engagement with each other during assembly.

The insert 80 without nails 18 includes an adhesive layer 18b shown in the present illustration, for the purpose of visualization, with the adhesive layer 18b separated and disposed facing the insert body 81.

Figure 7F:
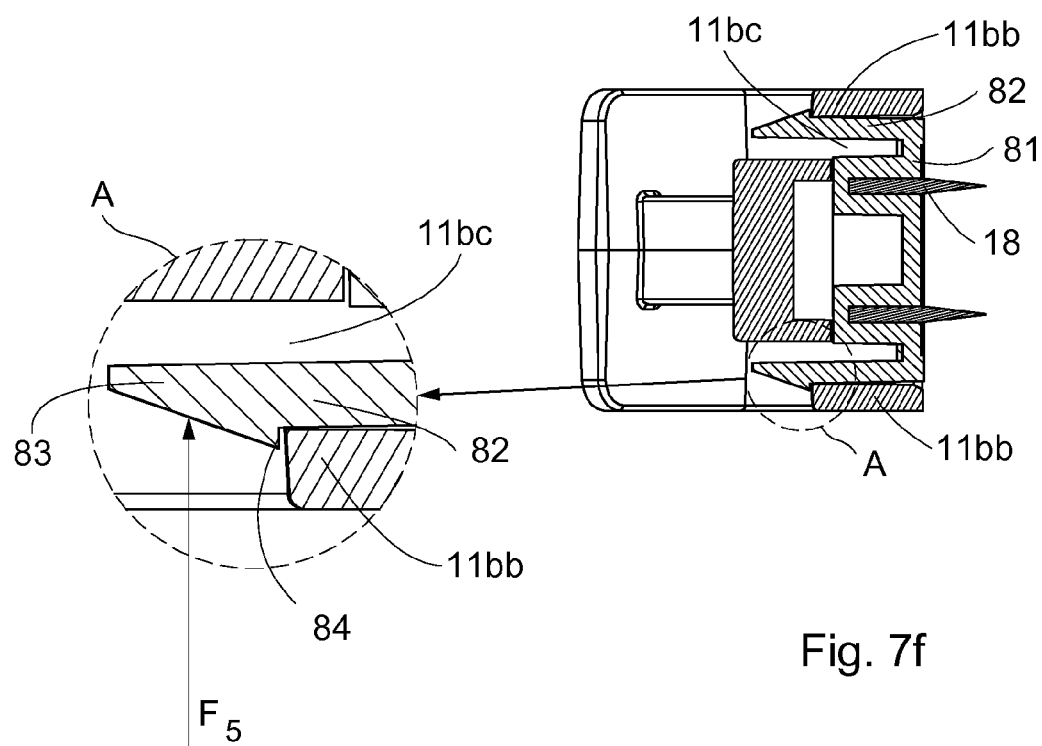
FIG. 7f is a schematic cross sectional view 7f-7f of the utility corner shelf bracket and of an insert, according to the present invention.

FIG. 7f is a schematic cross sectional view 7f-7f of the utility corner shelf bracket 100c and of an insert 80, according to the present invention.

The illustration marks detail A in a circle, which is magnified in the circle on the left side of the illustration. In the configuration shown in the present illustration, nails 18 are permanently fixed in the insert body 81. The insert arm 82 is disposed within a first bow window 11bc while a first bow flap 11bb prevents undesired separation of the insert arm 82, by means of an insert stair 84, which is part of the shape of the insert push button 83, which is leaning on it. In order to enable separation, the insert push button 83 must be pressed in the direction demonstrated by the pressing force $F_5$ arrow.

Figure 7G:
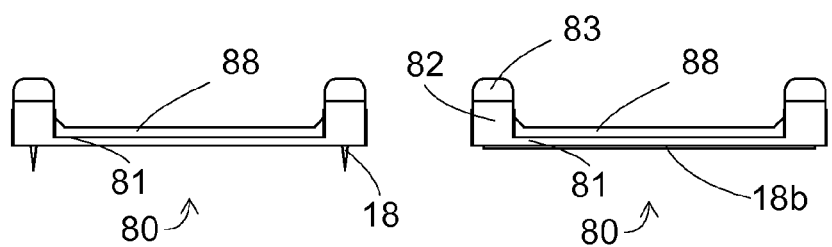
FIG. 7g is a top view schematic illustration of an illustrative, exemplary embodiment, of two inserts, according to the present invention.

FIG. 7g is a top view schematic illustration of an illustrative, exemplary embodiment, of two inserts 80, according to the present invention.

One of the two inserts 80 has nails 18 the other one has an adhesive layer 18b.

From the insert body 81 an elastic insert back rail 88 and elastic insert arms 82 protrude backward, while at their edges are disposed the insert push buttons 83.

The insert back rail 88 grants insert 80 mechanical strength and improves its grip of utility corner shelf bracket 100c (not shown in the present drawing), if both have shapes that conform to each other.

In the configurations shown in the present illustration, all components of each insert 80 are made as a single part of a uniform material, other than nails 18 and adhesive layer 18b, however, according to the present invention, other configurations are also possible.

Figure 7H:
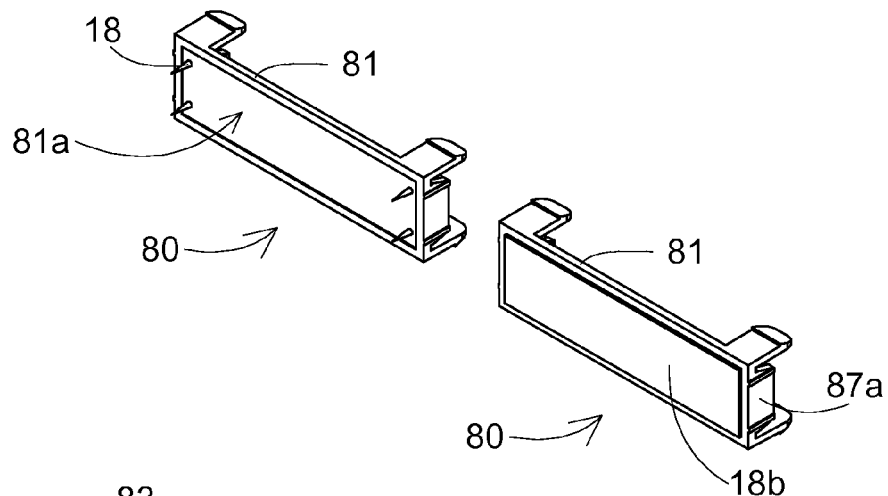
FIG. 7h is an isometric view schematic illustration of an illustrative, exemplary embodiment, of two inserts, according to the present invention.

FIG. 7h is an isometric view schematic illustration of an illustrative, exemplary embodiment, of two inserts 80, according to the present invention.

One of the two inserts 80 has nails 18 and the other one has an adhesive layer 18b. At each of both distant ends of insert 80, an insert outer side wall 87a protrudes backward from the insert body 81. In insert body 81, on the side wall facing the front, there can be an insert area 81a designated for partially containing an adhesive layer 18b, such that it protrudes slightly from the insert 80 toward the front.

Figure 7I:
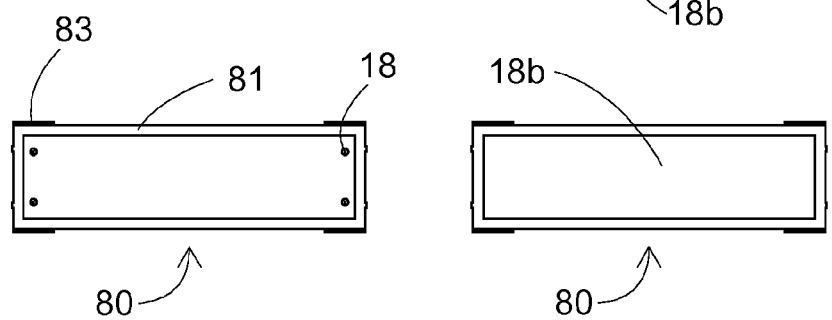
FIG. 7i is a front view schematic illustration of an illustrative, exemplary embodiment, of two inserts, according to the present invention.

FIG. 7i is a front view schematic illustration of an illustrative, exemplary embodiment, of two inserts 80, according to the present invention.

One of the two inserts 80 has nails 18 and the other one has an adhesive layer 18b. In the configuration shown in the present illustration, in a view from the front, each insert push button 83 slightly protrudes from the boundaries of the insert body 81, however other configurations are also possible according to the present invention.

Figure 7J:
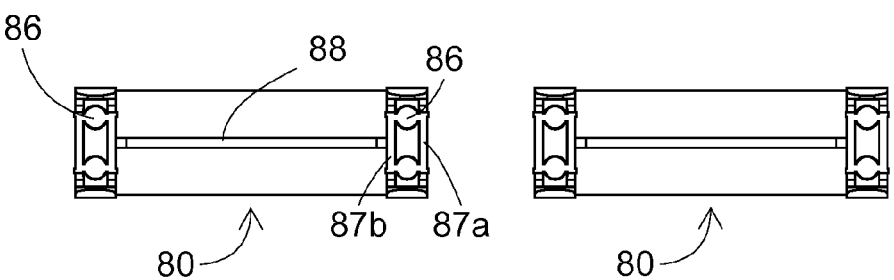
FIG. 7j is a back view schematic illustration of an illustrative, exemplary embodiment, of an insert, according to the present invention.

FIG. 7*j* is a back view schematic illustration of an illustrative, exemplary embodiment, of an insert 80, according to the present invention.

Parallel to each insert outer side wall 87*a* is an insert inner side wall 87*b*, while between every pair of an insert outer side wall 87*a* and an insert inner side wall 87*b* are disposed two insert nail housings 86. Each one of the nails 18 (not shown in the present drawing), is partially and permanently disposed within an insert nail housing 86.

The insert outer side walls 87*a* and the insert inner side walls 87*b* grant insert 80 mechanical strength and improve its grip of utility corner shelf bracket 100*c*, if it has a suitable, conforming shape.

Figure 7K:
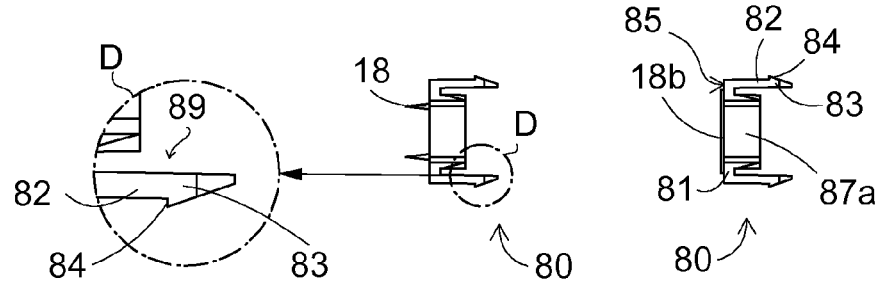
FIG. 7k is a side view schematic illustration of an illustrative, exemplary embodiment, of two inserts, according to the present invention.

FIG. 7*k* is a side view schematic illustration of an illustrative, exemplary embodiment, of two inserts 80, according to the present invention.

The illustration marks detail C in a circle, which is magnified in the circle on the left side of the illustration, which also shows inserting means 89.

One of the two inserts 80 has nails 18 the other one has an adhesive layer 18*b*. The insert outer side wall 87*a*, protruding from the insert body 81, is disposed between two insert arms 82. Each insert arm 82 has an insert push button 83 and an insert stair 84. For every pair of adjacent insert stairs 84, each insert stair 84 is facing outward, in an opposite direction. In order to remove an insert 80 from a utility corner shelf bracket 100*c* (not shown in the present drawing), each pair of insert push buttons 83 should be pressed inward, and then the insert 80 can be removed forward.

The adhesive layer 18*b* protrudes slightly forward from the insert outer surface 85. This protrusion can be at an order of magnitude of parts of a millimeter. The adhesive layer 18*b* can be made of adhesive applied to a sheet or in some other configuration to the insert outer surface 85, which can be covered with a protective sheet that is removed prior to performing attachment, for the purpose of preventing the adhesive from drying.

Even though the illustrations of the present application describe the structures of the inserts 80 in high detail, the present invention is in no way limited strictly to these structures, and according to the present invention, other structures are possible according to the present invention to fill the same functions.

The inserting means 89 includes the insert arm 82, the insert push button 83, and the insert stair 84, shown in the present illustration, however the present illustration is not limited to only one type of inserting means 89.

Figure 8A:
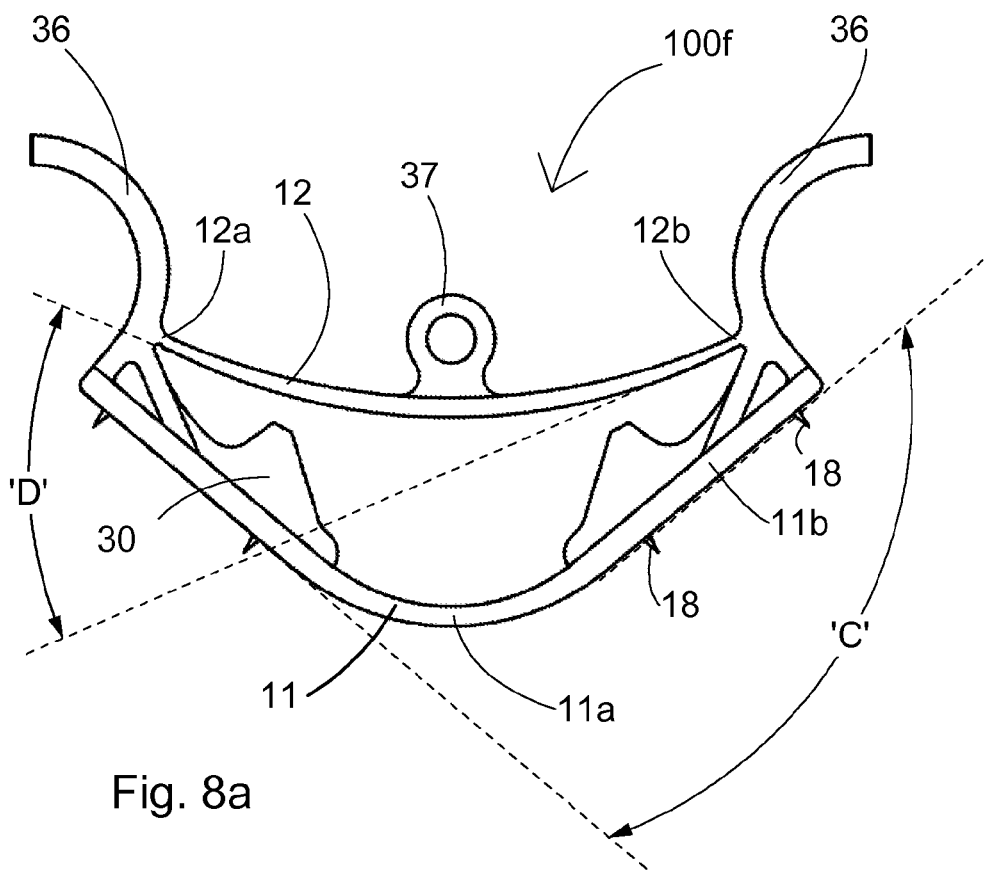
FIG. 8a is a top schematic illustration of an illustrative, exemplary third embodiment, first variant, of a utility corner shelf bracket, according to the present invention.

FIG. 8*a* is a top schematic illustration of an illustrative, exemplary third embodiment, first variant, of a utility corner shelf bracket 100*f*, according to the present invention.

The utility corner shelf bracket 100*f* is made, possibly not including the nails 18, as a one integral piece of an elastic material.

The third embodiment of a utility corner shelf bracket 100*f* does not have any pulling assembly and the forces attaching it to the walls come from the elasticity of the first bow 11, having a first bow arc 11*a*, and the second bow 12, which are, for all practical purposes, springs.

Compression prior to mounting in a wall corner is done by means of pressing two pressing handles 36. When the dimensions of the third embodiment of a utility corner shelf bracket 100*f* are sufficiently small, the compression can be done with one hand. Likewise, the third embodiment of a utility corner shelf bracket 100*f* can also include a hanging device 37, to which one can, for example, tie a string with a balloon on its end.

The second bow 12 has two ends, a first end of a second bow 12*a*, and a second end of a second bow 12*b*, while each end is disposed directly to the end of each of the two first bow wings 1ib or to one of the two pressing handles 36, while both options are acceptable and efficient.

The state shown in the present illustration is a free state, namely, there is no influence of any external forces on the utility corner shelf bracket 100*f* (third embodiment), and its shape is determined by the equilibrium of the internal elastic forces.

The first bow 11, which is a spring, as noted, is bent in the free state bow arc bending angle 'C', the value of which is smaller than 90 degrees, while the second bow 12, which is also a spring, as noted, is bent at second bow bending angle 'D'. It has been determined that for the purpose of effective functioning of the utility corner shelf bracket 100*f* (third embodiment), the angle 'D' must be larger than a value suitable for a given model of utility corner shelf bracket 100*f* according to its structure and its composing materials. A typical value is bending of 40 degrees.

The present illustration shows that strengthening ribs 30 can have a suitable shape and dimensions to serve as buffers preventing excessive compression of the sixth embodiment of a utility corner shelf bracket 100*f*. The third embodiment of a utility corner shelf bracket 100*f* can be composed of a single part and of a single material, without any moving parts, namely without any hinges or the like, and it can be manufactured in an injection process, without any connection means such as adhesives, welding, screws, etc. between its various parts.

However, there is an advantage that the nails 18 be composed of a rigid material, for example a metal, and be connected to an assembly that is cast at a later stage. In this configuration as well, the third embodiment of a utility corner shelf bracket 100*f* has no connection means such as adhesives, welding, screws, etc. between its various parts.

Good materials for the production of a third embodiment of a utility corner shelf bracket 100*f* can be selected from the group of polymers.

Figure 8B:
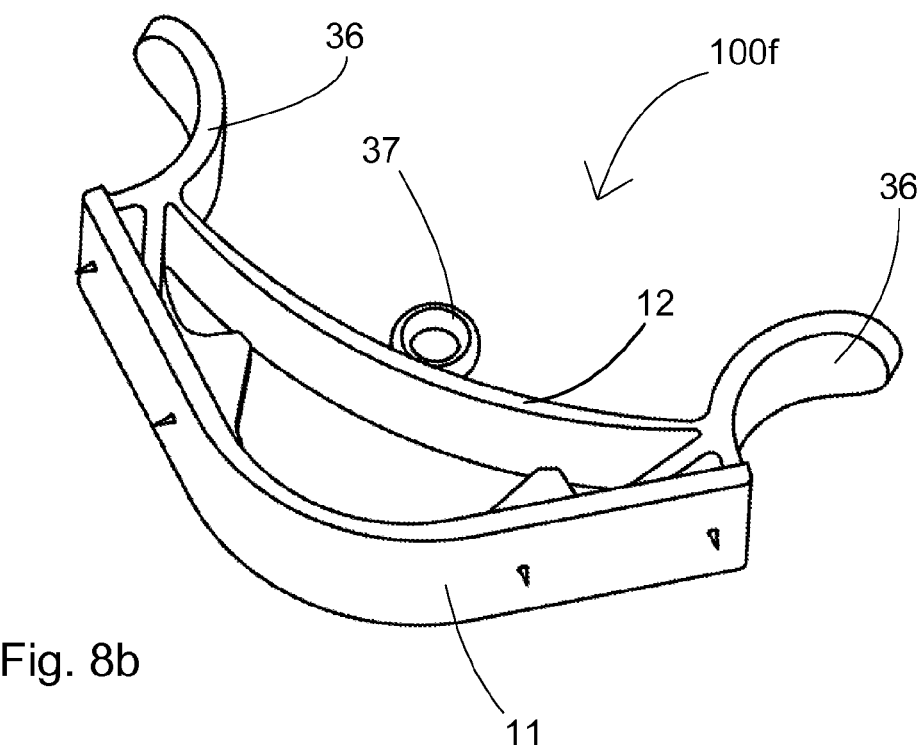
FIG. 8b is an isometric schematic illustration of an illustrative, exemplary third embodiment, first variant, of the utility corner shelf bracket, according to the present invention.

FIG. 8*b* is an isometric schematic illustration of an illustrative, exemplary third embodiment, first variant, of the utility corner shelf bracket 100*f*, according to the present invention.

Figure 8C:
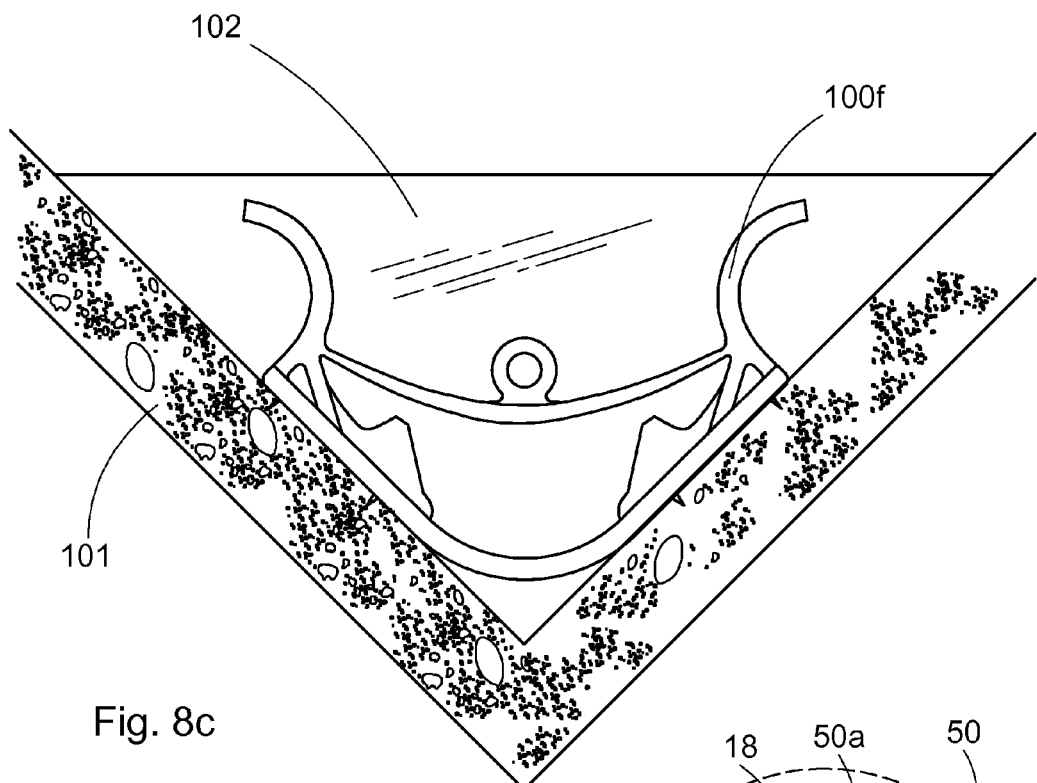
FIG. 8c is a top schematic illustration of an illustrative, exemplary third embodiment, first variant, of the utility corner shelf bracket, installed in a corner wall upon which is mounted a shelf, according to the present invention.

FIG. 8*c* is a top schematic illustration of an illustrative, exemplary third embodiment, first variant, of the utility corner shelf bracket 100*f*, installed in a corner wall 101 upon which is mounted a corner shelf 102, according to the present invention.

Corner shelf 102 can be transparent, as shown in the present illustration, or opaque. The corner wall 101 shown in the present illustration has an angle of practically ninety degrees, and the corner shelf bracket 100*f* was mounted into the corner after it was sufficiently compressed from its released mode, and after being placed next to the corner wall 101, opened and latched into place by means of its elasticity.

Figure 8D:
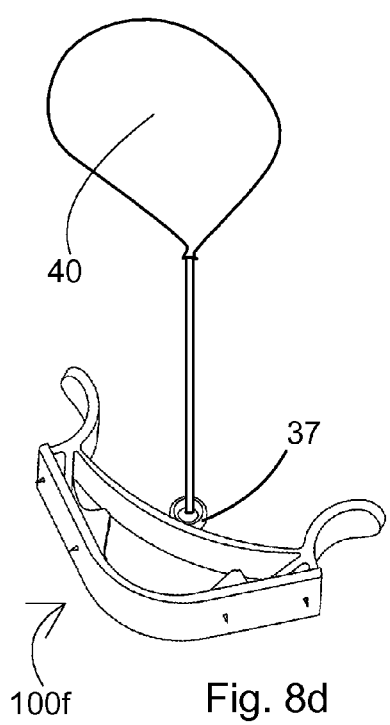
FIG. 8d is an isometric schematic illustration of an illustrative, exemplary third embodiment, first variant, of the utility corner shelf bracket, which is attached to a load, according to the present invention.

FIG. 8*d* is an isometric schematic illustration of an illustrative, exemplary third embodiment, first variant, of the utility corner shelf bracket 100*f* which is attached to a load 40, according to the present invention.

Load 40, in the case of the present illustration, is a string and an attached balloon which is filled with a gas lighter than air so that it floats upwards. Load 40 can also be heavier than air, and can include various different means, such as string, chains, or hooks, for connection to the utility corner shelf bracket 100f. The connection can be to hanging device 37 as well as to other locations of the utility corner shelf bracket 100f.

Figure 8E:
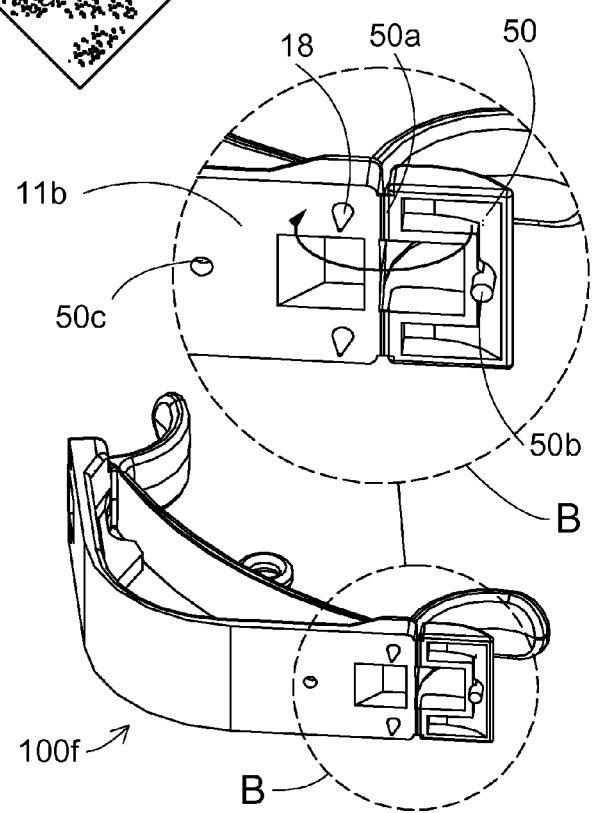
FIG. 8e is an isometric schematic illustration of an illustrative, exemplary third embodiment, second variant, of the utility corner shelf bracket having a protector connector, according to the present invention.

FIG. 8e is an isometric schematic illustration of an illustrative, exemplary third embodiment, second variant, of the utility corner shelf bracket 100f having a nail protector 50, according to the present invention.

In order to reduce the risk of injury from a nail 18, the utility corner shelf bracket 100f can be equipped with nail protectors 50, one of which is shown in the present illustration.

The illustration marks detail B in a circle, which is magnified in the circle on the upper side of the illustration, which also shows the nail protector 50.

Nail protector 50 is connected to first bow wing 11b by means of a protector connector 50a, which is thin relative to the thickness of the first bow wing 11b, enabling bending and shifting the protector connector 50a from an open state, as shown in the present illustration, to a closed state (by rotational movement as indicated by an arrow in the illustration), in which the protector connector 50a covers nails 18.

The protector connector 50a can also be equipped with a protector pin 50b, which in a closed state will be inserted into a first bow wing hole 50c, in which it will be held by forces of friction, until force is applied to release it.

Figure 8F:
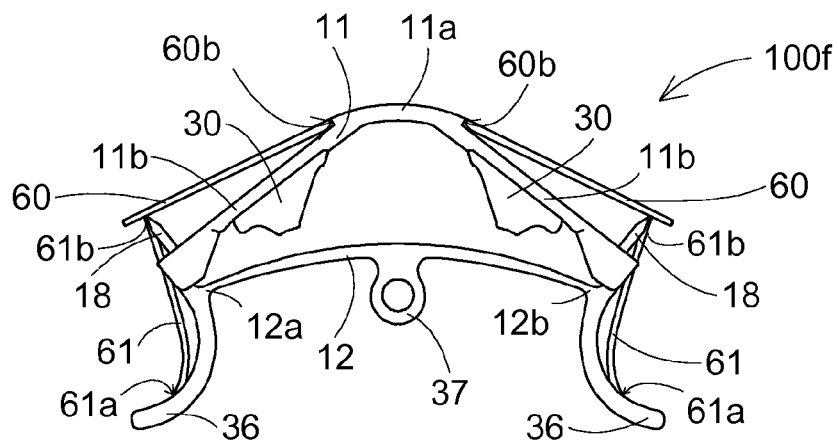
FIG. 8f is a top schematic illustration of an illustrative, exemplary third embodiment, third variant, of the utility corner shelf bracket, having a protective wing in open state, according to the present invention.

FIG. 8f is a top schematic illustration of an illustrative, exemplary third embodiment, third variant, of the utility corner shelf bracket 100f, having a protective wing 60 in open state, according to the present invention.

The third embodiment, third variant, of the utility corner shelf bracket 100f, including all of the components described with regard to FIG. 11a, namely to the sixth embodiment, first variant, of the utility corner shelf bracket 100f, namely it includes the first bow 11, having a first bow arc 11, and tow first bow wings 11b, the second bow 12 having two ends, a first end of a second bow 12a, and a second end of a second bow 12b, the two pressing handles 36, the hanging device 37, and the nails 18.

Furthermore, the sixth embodiment, third variant, of the utility corner shelf bracket 100f includes two protective wings 60, and two protective wing supports 61.

The protective wings 60 are meant to shield from damage that can be caused to humans, animals, and inanimate objects as a result of contact with nails 18.

Each protective wing 60 is connected to the first bow 11 at the protective wing connecting end 60b. The connection can be by various means, such as by means of a shaft, an elastic connection, or any other suitable connection, while it is preferable for the connection to be such that will generate a moment driving the protective wing 60 toward a first bow wing 11b. In the open state shown in the present illustration, each protective wing 60 is supported toward a protective wing support 61 and protects from contact with nails 18.

Each protective wing support 61 is connected at a protective wing support first end 61a to one of the two pressing handles 36.

Figure 8G:
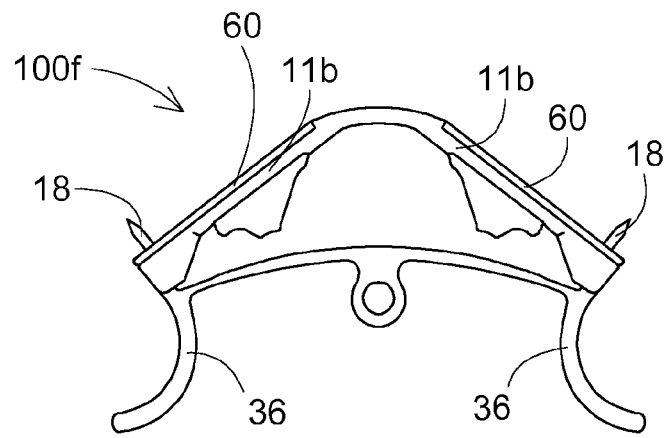
FIG. 8g is a top schematic illustration of an illustrative, exemplary third embodiment, third variant, of the utility corner shelf bracket, having a protective wing in closed state, according to the present invention.

FIG. 8g is a top schematic illustration of an illustrative, exemplary third embodiment, third variant, of the utility corner shelf bracket 100f, having a protective wings 60 in closed state, according to the present invention.

In this state, each protective wing support 61, which is made of elastic material, is within a pressing handle groove 36a, and it is impossible to see neither the protective wing supports 61 nor the pressing handle grooves 36a.

Each one of the protective wings 60 is now pressed to one of the first bow wings 11b and the nails 18 are exposed, a state which is suitable for attachment to the wall.

Figure 8H:
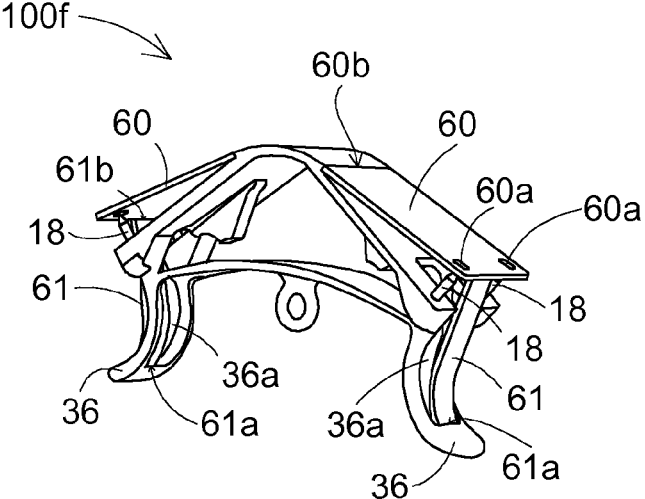
FIG. 8h is an isometric schematic illustration of an illustrative, exemplary third embodiment, third variant, of the utility corner shelf bracket, having a protective wing in open state, according to the present invention.

FIG. 8h is an isometric schematic illustration of an illustrative, exemplary third embodiment, third variant, of the utility corner shelf bracket 100f, having a protective wings 60 in open state, according to the present invention.

The present illustration also clearly shows both pressing handle grooves 36a, one in each pressing handle 36, as well as the manner in which a protective wing supports 61 protective wing support first end 61a to a pressing handle 36, and supports a protective wing 60.

Likewise the present illustration shows protective wing holes 60a enabling the passage of nails 18 through a protective wing 60.

Figure 8I:
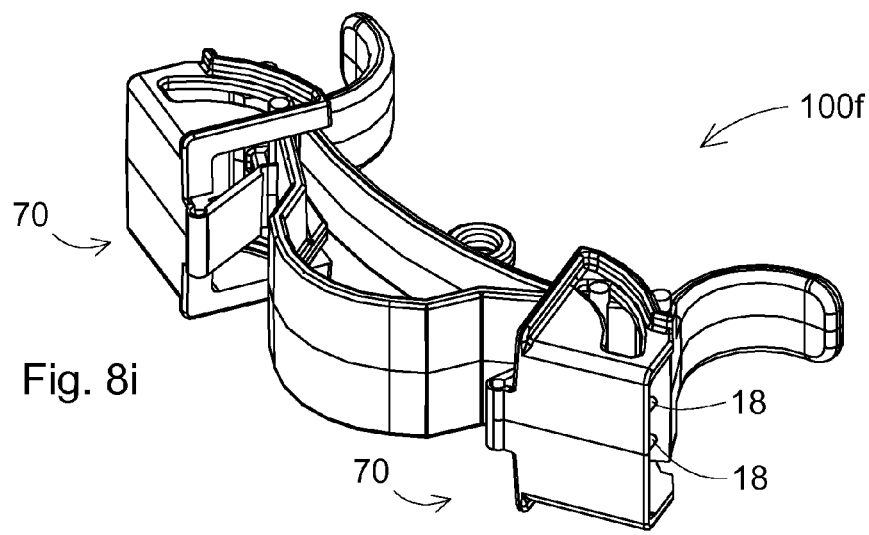
FIG. 8i is an isometric schematic illustration of an illustrative, exemplary third embodiment, fourth variant, of the utility corner shelf bracket having two nail shields in a protective state according to the present invention.

FIG. 8i is an isometric schematic illustration of an illustrative, exemplary third embodiment, fourth variant, of a utility corner shelf bracket 100f, having two nail shields 70 in a protective state according to the present invention.

The two nail shields 70 prevent undesired human contact with the nails 18. This is a state suitable for storage of the utility corner shelf bracket 100f prior to use.

Figure 8J:
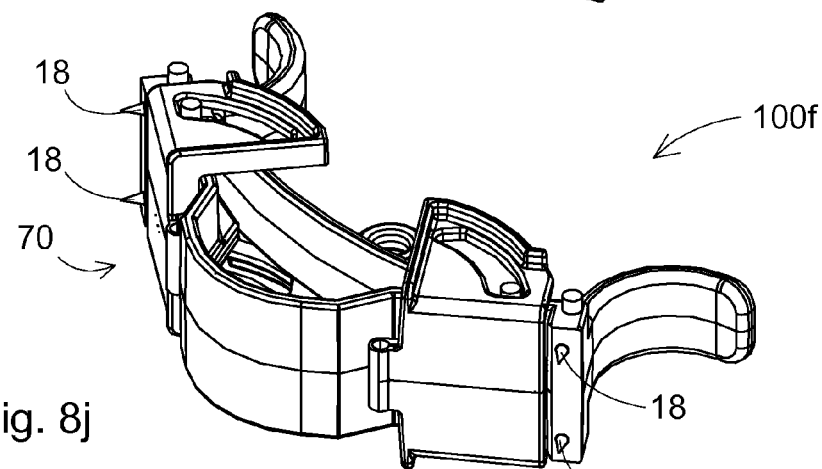
FIG. 8j is an isometric schematic illustration of an illustrative, exemplary third embodiment, fourth variant, of the utility corner shelf bracket, having two nail shields in a nails exposed state according to the present invention.

FIG. 8j is an isometric schematic illustration of an illustrative, exemplary third embodiment, fourth variant, of the utility corner shelf bracket 100f, having two nail shields 70, in a nails exposed state according to the present invention.

The utility corner shelf bracket 100f is also in this state when it is connected to a corner wall 101 (not shown in the present drawing). In this state, the nail shields 70 aren't disrupting the exposure of nails 18.

Figure 8K:
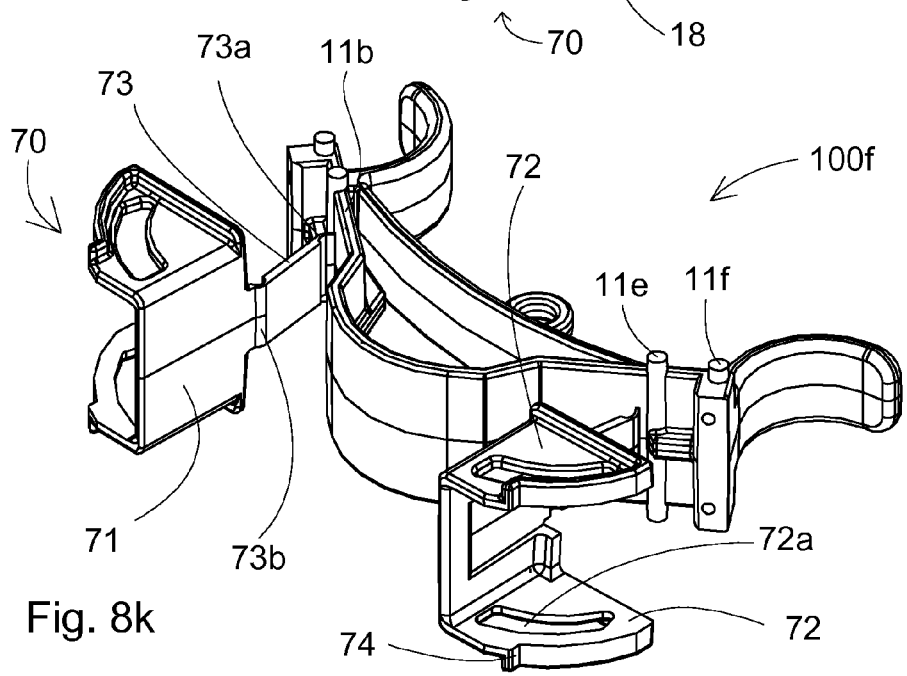
FIG. 8k is an isometric schematic illustration of an illustrative, exemplary third embodiment, fourth variant, of the utility corner shelf bracket having two nail shields in an immediately after molding state according to the present invention.

FIG. 8k is an isometric schematic illustration of an illustrative, exemplary third embodiment, fourth variant, of the utility corner shelf bracket 100f, having two nail shields 70, in an immediately after molding state according to the present invention.

This state is achieved immediately after casting in the production process of the utility corner shelf bracket 100f and prior to its protective state.

Each one of the two nail shields 70 has a shield front wall 71 which is connected to two shield side walls 72. On each shield side wall 72 there is a side wall slot 72a.

Each shield front wall 71 is connected to a first bow wing 11b by means of a shield arm 73 one end of which is connected to a first integral pivot 73a and the other end of which is connected to a second integral pivot 73b.

Figure 8L:
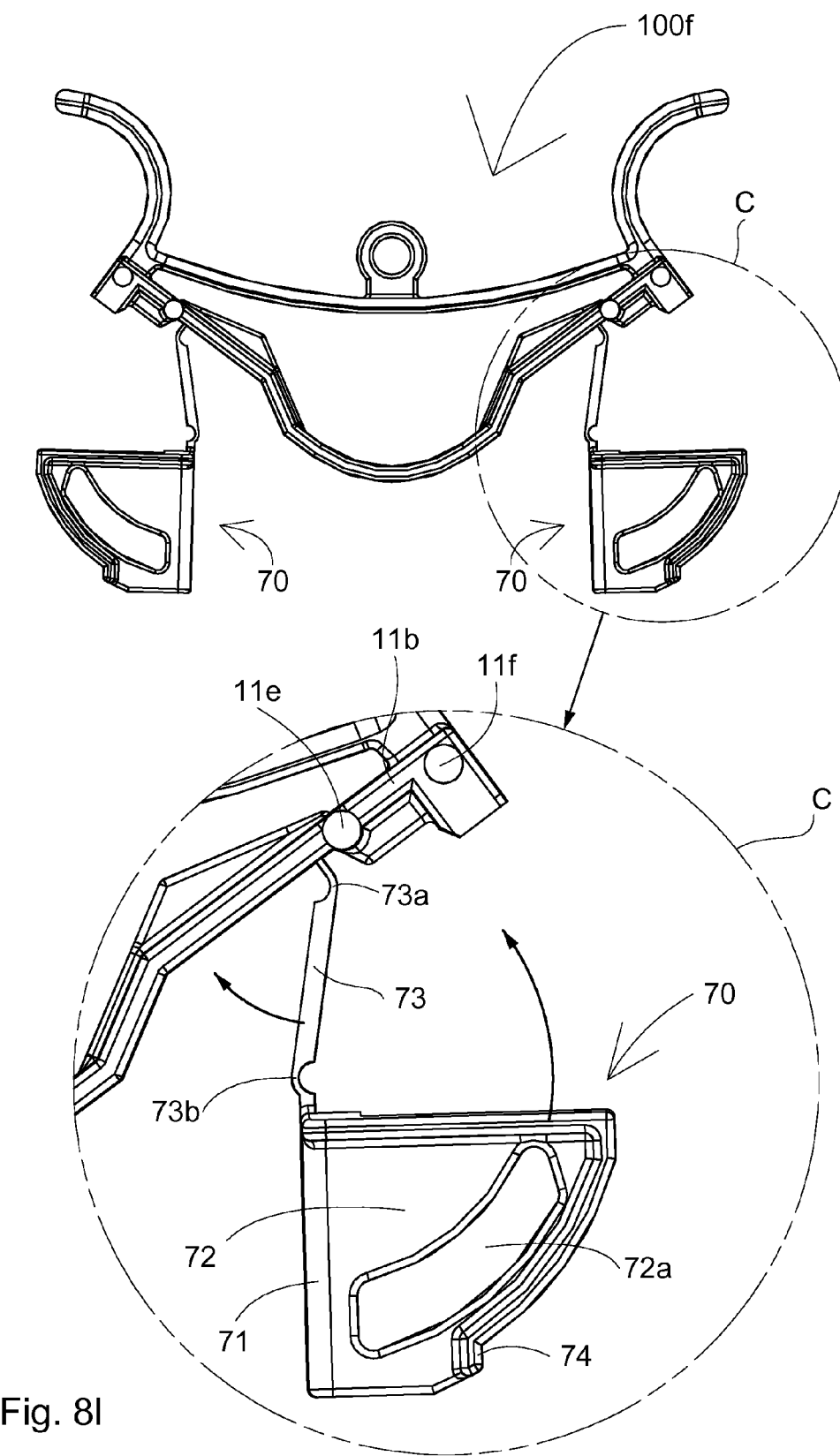
FIG. 8l is a top view schematic illustration of an illustrative, exemplary third embodiment, fourth variant, of the utility corner shelf bracket having two nail shields in an immediately after molding state according to the present invention.

FIG. 8l is a top view schematic illustration of an illustrative, exemplary third embodiment, fourth variant, of the utility corner shelf bracket 100f, having two nails shields 70, in an immediately after molding state according to the present invention.

The illustration marks detail C in a circle, which is magnified in the circle on the lower side of the illustration. The present illustration shows no nails 18, which can be assembled, according to the present invention, at a later stage of production.

In order to shift the utility corner shelf bracket 100f from the immediately after molding state to a protective state, a moment must be activated to cause angular movement in the direction shown by arrow α, the center of which is second integral pivot 73b of the nails shield 70 relative to the shield arm 73. Furthermore, a moment must be activated to cause angular movement in the direction shown by arrow β, the center of which is the first integral pivot 73a of the shield arm 73 relative to the first bow wing 11. Likewise, the elastic shield side wall 72 should be tilted in a direction perpendicular to the illustration sheet, and released at a position ensuring that a first bow first pin 11e is inserted into the side wall slot 72a. The same should be done for the concealed shield side wall 72 not shown in the present illustration.

Once the first bow first pins 11e are within the side wall slots 72a, they prevent the nail shields 70 from returning to the immediately after molding state that would occur due to the elastic qualities of the utility corner shelf bracket 100f.

The first bow second pin 11f is located such that in certain states, it will prevent movement of the nail shield 70 when it meets with the shield stair 74.

As used herein in the specification and claims sections, the term 'integral pivot' refers to a device that enables performance of repeated angular movements with at least two components connected to it, with which it composes a single integrated part, which can be made of a uniform material.

Figure 8M:
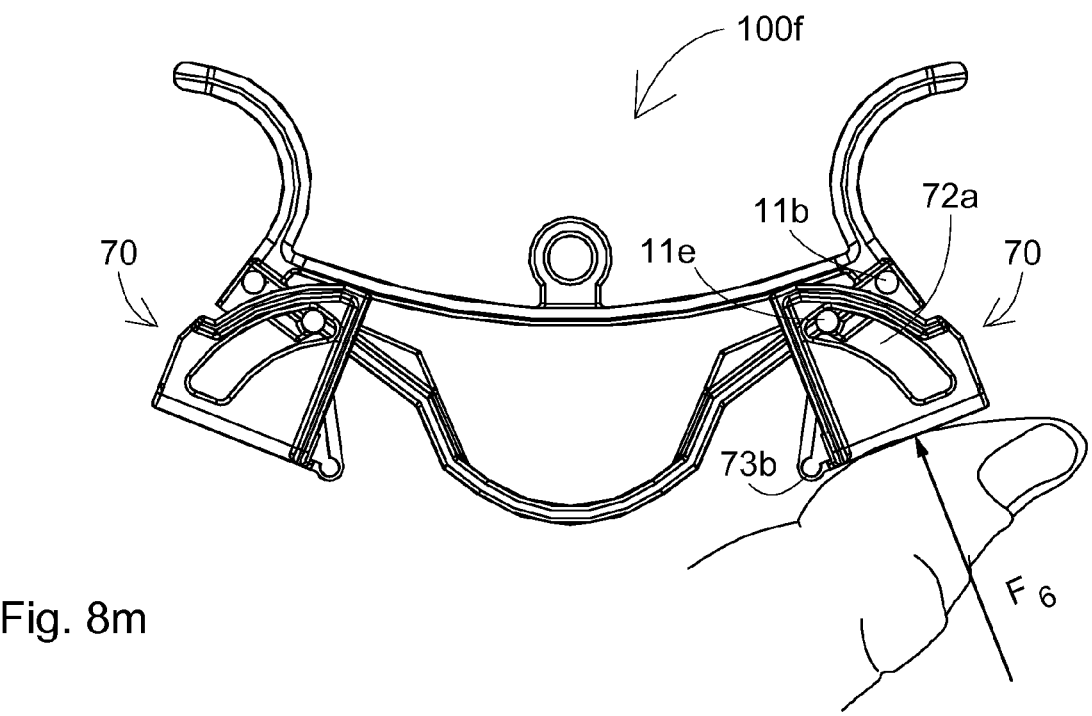
FIG. 8m is a top view schematic illustration of an illustrative, exemplary third embodiment, fourth variant, of the utility corner shelf bracket having two nail shields in a protective state according to the present invention.

FIG. 8m is a top view schematic illustration of an illustrative, exemplary third embodiment, fourth variant, of the utility corner shelf bracket 100f, having two nails shields 70, in a protective state according to the present invention.

The first bow first pins 11e, when engaged with the side wall slots 72a, prevent the utility corner shelf bracket 100f from returning to the immediately after molding state. The shape of the side wall slot 72a is not limited to that of an arc as shown in the present illustration, and it can be shaped as any other orifice, as long as it fills its purpose as described so far.

When a force $F_6$ is applied on the nails shield 70 as shown in the present illustration, for example by a finger, the nails shield 70 moves toward the first bow wing 11b.

Figure 8N:
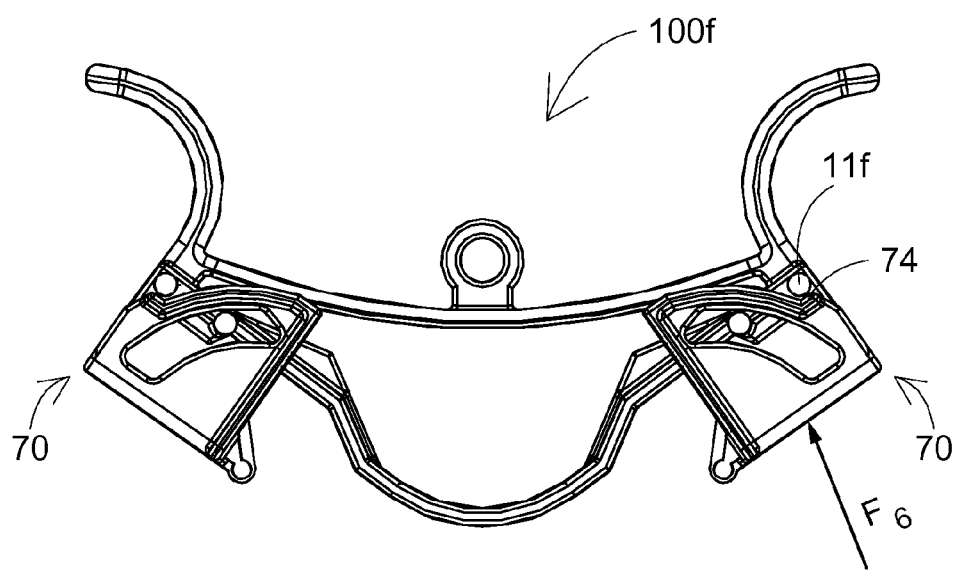
FIG. 8n is a top view schematic illustration of an illustrative, exemplary third embodiment, fourth variant, of the utility corner shelf bracket having two nail shields in a safe state according to the present invention.

FIG. 8n is a top view schematic illustration of an illustrative, exemplary third embodiment, fourth variant, of the utility corner shelf bracket 100f, having two nail shields 70, in a safe state according to the present invention.

The continued activation of the force $F_6$ causes further movement of the nails shield 70 until it stops as a result of contact of the shield stair 74 with the first bow second pin 11f. In this state, if the force $F_6$ is generated by the pressure of a finger, the finger will not be injured seeing as the nails 18 are not exposed but rather contained within the nails shield 70.

Figure 8O:
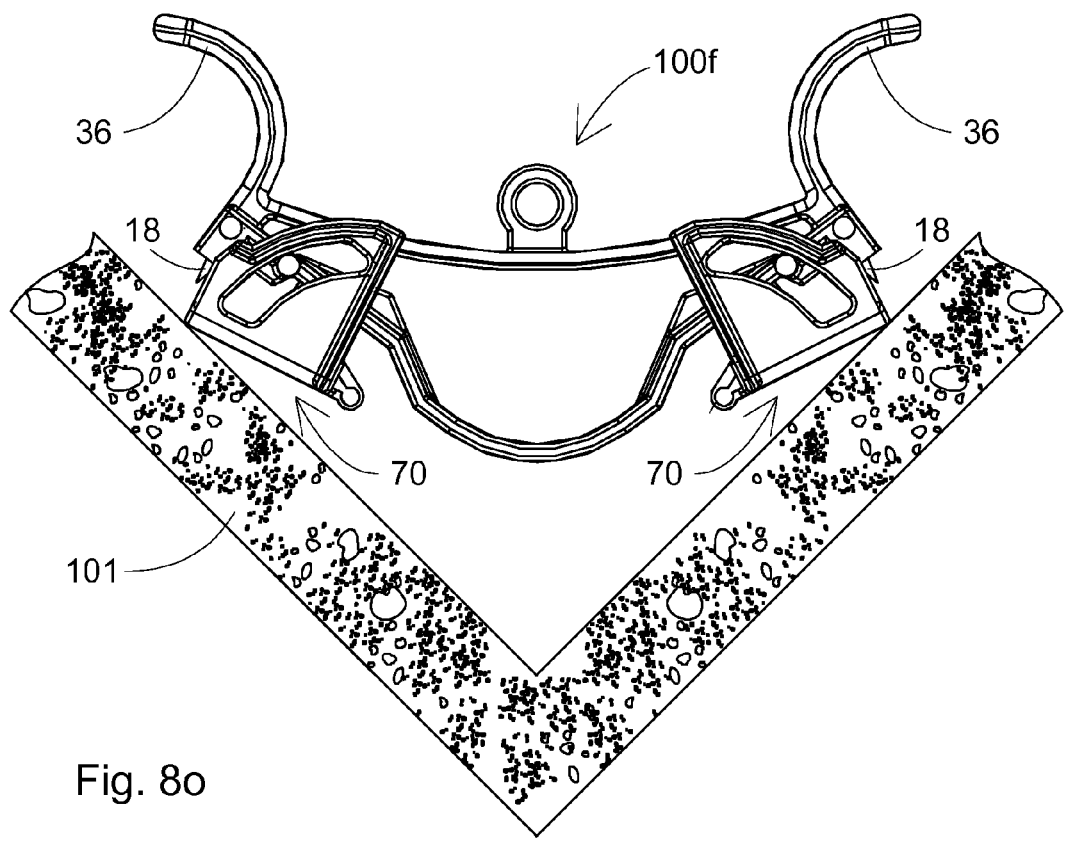
FIG. 8o is a top view schematic illustration of an illustrative, exemplary third embodiment, fourth variant, of the utility corner shelf bracket, having two nail shields in a pressed against corner walls state, according to the present invention.

FIG. 8o is a top view schematic illustration of an illustrative, exemplary third embodiment, fourth variant, of the utility corner shelf bracket 100f, having two nails shields 70, in a press against corner walls 101 state, according to the present invention.

Prior to installation of the utility corner shelf bracket 100f on corner walls 101, the user presses the pressing handles 36 so that they draw close to each other, and disposes the utility corner shelf bracket 100f as close as possible to the designated place of installation, so that both the nail shields 70 are in contact with the corner walls 101.

In the next stage, the user releases the force from the pressing handles 36, and thanks to the elasticity of the first bow wing 11b and of the second bow 12, pressure forces of the corner walls 101 are generated upon the nails shields 70, causing them to move relative to the remaining components of the utility corner shelf bracket 100f, and unlike the movement described in the previous illustration and accompanying description, the movement of each one of the nail shields 70 in the state shown in the present illustration does result in the exposure of the nails 18, subsequently enabling contact of the nails 18 with the corner walls 101 and even penetration.

Figure 8P:
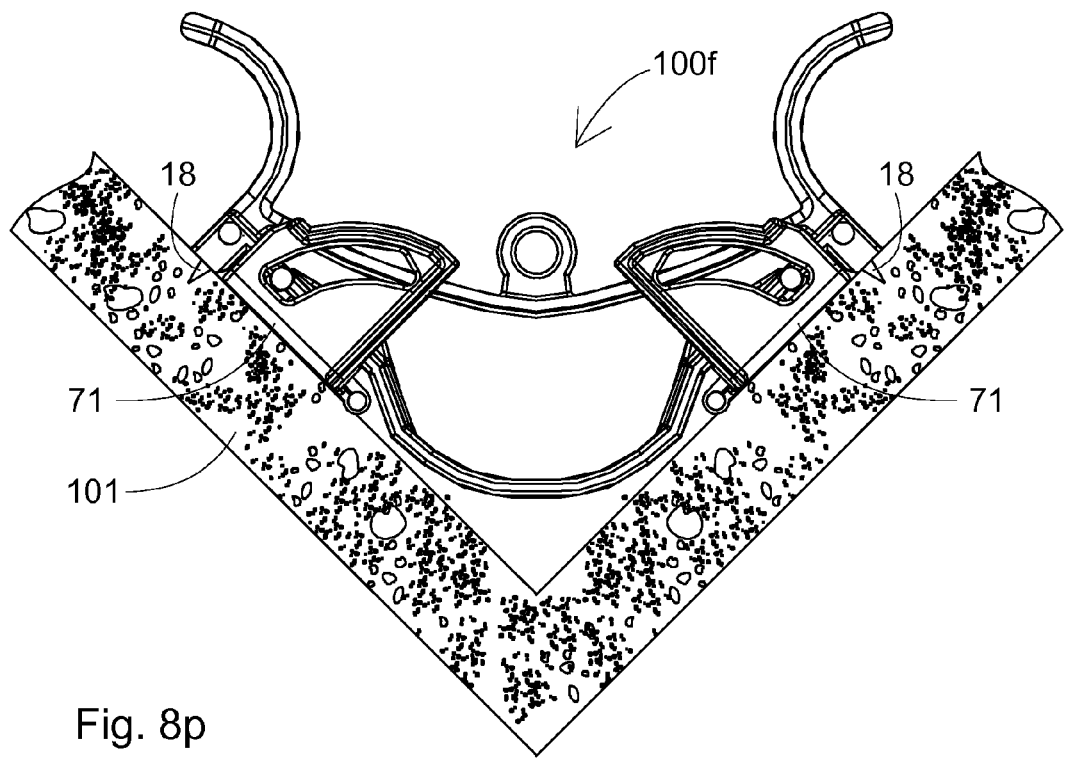
FIG. 8p is a top view schematic illustration of an illustrative, exemplary third embodiment, fourth variant, of the utility corner shelf bracket having two nails shields in an installed on a corner walls state according to the present invention.

FIG. 8p is a top view schematic illustration of an illustrative, exemplary third embodiment, fourth variant, of the utility corner shelf bracket 100f, having two nails shields 70, in an installed on a corner walls 101 state according to the present invention.

In this state, the shield front walls 71 are attached to the corner walls 101 and the nails 18 penetrate them.

While the invention has been described with respect to a limited number of embodiments, it will be appreciated that many variations, modifications and other applications of the invention may be made.

What is claimed is:

1. A utility corner shelf bracket (100) comprising:
   a first bow (11), said first bow (11) including: two first bow wings (11b);
   a first bow arc (11a), wherein each one of said first bow wings (11b) is operatively connected to said first bow arc (11a);
   at least one nail (18) operatively connected to each one of said first bow wings (11b);
   a second bow (12) operatively connected to said first bow (11); and
   a pulling assembly (20), having a length, operatively connected to said second bow (12), wherein an operation of said pulling assembly (20) creates a pulling force on said second bow (12), and wherein said second bow (12) applies force to said two first bow wings (11b),
   further comprising at least one insert (80) inserted with said utility corner shelf bracket (100).

2. The utility corner shelf bracket (100) of claim 1, wherein each one of said two first bow wings (11b) includes at least one first bow window (11bc), wherein each one of said first bow window (11bc) is configured to contain an insert arm (82).

3. The utility corner shelf bracket (100) of claim 1, wherein said pulling assembly (20) includes: a turnbuckle sleeve (21c); a central rod (27), having two ends, wherein one of said ends of said central rod (27) is disposed on said second bow (12), and wherein one of said ends of said central rod (27) is engaged with said turnbuckle sleeve (21c); and a screwing rod (22a) having two ends wherein one end of said screwing rod end is engaged with said turnbuckle sleeve (21c).

4. The utility corner shelf bracket (100) of claim 3 further comprising: a T rod (31) disposed on said screwing rod (23c); and two side rods (28) wherein each one of said side rods (28) is disposed on said T rod (31), and wherein a rotation of said turnbuckle sleeve (21c) changes said length of said pulling assembly (20).

5. The utility corner shelf bracket (100) of claim 1, wherein said at least one insert (80) includes: an insert body (81); and an adhesive layer (18b) attached to said insert body (81).

6. The utility corner shelf bracket (100) of claim 1, wherein said at least one insert (80) includes: an insert body (81); and at least one nail (18) attached to said insert body (81).

7. The utility corner shelf bracket (100) of claim 1, further comprising an insert body (81); and at least one inserting means (89) attached to said, wherein said insert (80) is adapted to be inserted with a utility corner shelf bracket (100).

8. The utility corner shelf bracket (100) of claim 7 wherein said inserting means (89) includes: an insert arm (82); and an insert push button (83) having an insert stair (84), said insert push button (83) is attached to said insert arm (82).

\* \* \* \* \*